United States Patent
Hwang et al.

(10) Patent No.: US 9,748,576 B2
(45) Date of Patent: Aug. 29, 2017

(54) POLYMER, BINDER AND NEGATIVE ELECTRODE INCLUDING THE POLYMER, AND LITHIUM BATTERY INCLUDING THE NEGATIVE ELECTRODE

(71) Applicant: Samsung Electronics Co., Ltd., Suwon-si, Gyeonggi-do (KR)

(72) Inventors: Seungsik Hwang, Seongnam-si (KR); Jaeman Choi, Hwaseong-si (KR); Yeonji Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 396 days.

(21) Appl. No.: 14/589,172

(22) Filed: Jan. 5, 2015

(65) Prior Publication Data

US 2016/0049660 A1 Feb. 18, 2016

(30) Foreign Application Priority Data

Aug. 12, 2014 (KR) .......................... 10-2014-0104532

(51) Int. Cl.
*H01M 4/62* (2006.01)
*H01M 4/38* (2006.01)
*H01M 4/587* (2010.01)
*C08L 33/12* (2006.01)
*H01M 4/48* (2010.01)
*H01M 10/052* (2010.01)

(52) U.S. Cl.
CPC ............. *H01M 4/622* (2013.01); *C08L 33/12* (2013.01); *H01M 4/386* (2013.01); *H01M 4/387* (2013.01); *H01M 4/483* (2013.01); *H01M 4/587* (2013.01); *H01M 10/052* (2013.01)

(58) Field of Classification Search
CPC ...... H01M 4/622; H01M 4/386; H01M 4/387; H01M 4/483; H01M 4/587; H01M 10/052; C08L 33/12
See application file for complete search history.

(56) References Cited

U.S. PATENT DOCUMENTS

| 4,693,962 A * | 9/1987 | Tamura .................. G03C 1/685 430/345 |
| 9,331,338 B2 | 5/2016 | Hwang et al. |
| 2009/0081553 A1* | 3/2009 | Kondo .................. H01M 2/021 429/314 |
| 2013/0236778 A1 | 9/2013 | Choi et al. |
| 2017/0038501 A1* | 2/2017 | Kolluru .................... B65B 5/04 |

FOREIGN PATENT DOCUMENTS

| KR | 1020130104013 A | 9/2013 |
| KR | 1020130117350 A | 10/2013 |
| KR | 1020130118264 A | 10/2013 |
| KR | 1020130123831 A | 11/2013 |
| KR | 1020140061955 A | 5/2014 |

* cited by examiner

*Primary Examiner* — Raymond Alejandro
(74) *Attorney, Agent, or Firm* — Cantor Colburn LLP

(57) ABSTRACT

A polymer including a first repeating unit including at least one carboxyl group substituted with a cation and a second repeating unit including at least one carboxyl group substituted with a moiety containing a dihydroxyphenyl group.

18 Claims, 7 Drawing Sheets

POLYMER, BINDER AND NEGATIVE ELECTRODE INCLUDING THE POLYMER, AND LITHIUM BATTERY INCLUDING THE NEGATIVE ELECTRODE

CROSS-REFERENCE TO RELATED APPLICATION

This application claims priority to Korean Patent Application No. 10-2014-0104532, filed on Aug. 12, 2014, in the Korean Intellectual Property Office, and all the benefits accruing therefrom under 35 U.S.C. §119, the content of which is incorporated herein in its entirety by reference.

BACKGROUND

1. Field

The present disclosure relates to a polymer, a binder and a negative electrode including the polymer, and a lithium battery including the negative electrode.

2. Description of the Related Art

Lithium batteries are characterized by high voltage and high energy density, and thus may be used in various applications. For example, lithium batteries may be used in hybrid electric vehicles (HEV), plug-in hybrid electric vehicles (PHEV), and the like. To be suitable for electric vehicles, lithium batteries should be operable at high temperatures, have high charge and discharge capacities, and have long lifespans.

An electrode, e.g., a negative electrode, for a lithium battery may include a negative electrode active material layer on edges of a current collector. The negative electrode active material layer may be delaminated when the current collector is roll-pressed and punched. In addition, due to the stress caused by charging and discharging of the lithium battery, cracks may form in the negative electrode. Accordingly, capacity and lifetime of the lithium battery may be degraded.

In this regard, there is a need for a polymer, provides improved adhesion between negative electrode materials included in the negative electrode active material layer, adhesion of negative electrode materials to a current collector, and capacity and lifetime of the lithium battery.

SUMMARY

Provided is a polymer capable of improving adhesion between a negative electrode material included in a negative electrode active material layer and adhesion of the negative electrode material to a current collector.

Provided is a binder including the polymer.

Provided is a negative electrode including the binder, which is capable of improving capacity and lifetime of a lithium battery.

Provided is a lithium battery including the negative electrode.

Additional aspects will be set forth in part in the description which follows and, in part, will be apparent from the description, or may be learned by practice of the presented embodiments.

According to an aspect, a polymer includes:

a first repeating unit including at least one carboxyl group substituted with a; and a second repeating unit including at least one carboxyl group substituted with a moiety containing a dihydroxyphenyl group.

According to another aspect, a binder includes the polymer.

According to another aspect, a negative electrode includes the binder and a negative electrode active material.

According to another aspect, a lithium battery includes the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
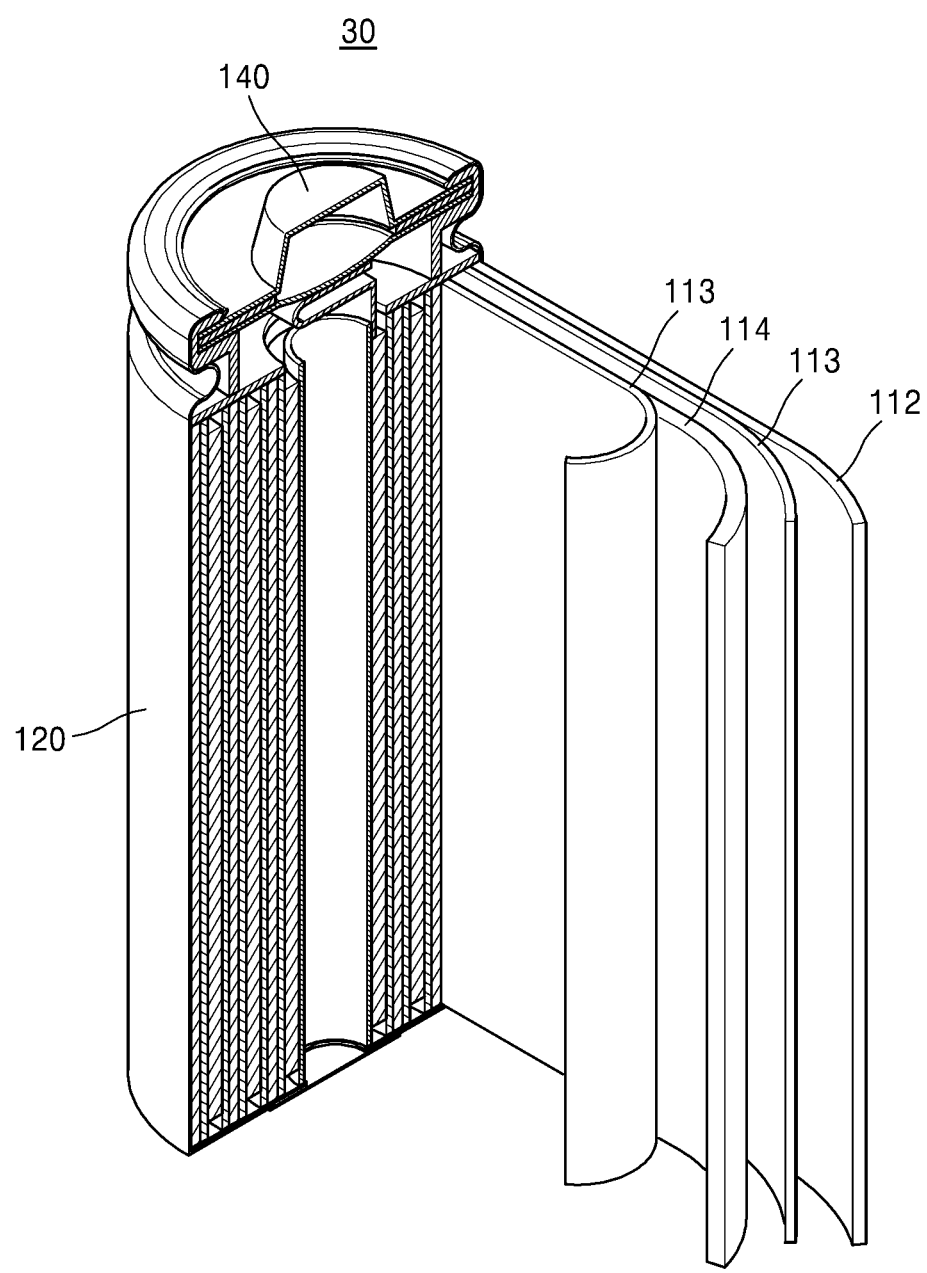
FIG. 1 is an exploded perspective view of an embodiment of a lithium battery according to an embodiment.

Reference will now be made in detail to embodiments of a polymer, a binder and a negative electrode that include the polymer, and a lithium battery that includes the negative electrode, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect, there is provided a polymer that includes:

a first repeating unit including at least one carboxyl group, wherein a hydrogen of the at least one carboxyl group of the first repeating unit is substituted with a cation; and a second repeating unit including at least one carboxyl group, wherein a hydrogen of the at least one carboxyl group of the second repeating unit is substituted with a moiety containing a dihydroxyphenyl group. The polymer includes at least one carboxyl group substituted with a moiety containing a dihydroxyphenyl group, and accordingly, such a polymer may improve adhesion between negative electrode materials included in a negative electrode active material layer and adhesion of negative electrode materials to a current collector. In addition, the polymer includes at least one carboxyl group substituted with a cation, and accordingly, such a polymer may also reduce polarization of a negative electrode including the polymer and improve capacity and lifetime of a lithium battery.

The cation may include at least one selected from $Li^+$, $Na^+$, $K^+$, and $NH_4^+$. For example, the cation may be $Li^+$. The cation may be a solvate. As used herein, the term "solvate" may refer to a complex between a solvent and a cation. Accordingly, the term "a solvate of the cation" may refer to a complex between the cation and the molecules of the solvent, for example, a complex between any one of $Li^+$, $Na^+$, $K^+$, and $NH_4^+$, and the molecules of the solvent.

The moiety containing the dihydroxyphenyl group may include at least one selected from a moiety containing a 3,4-dihydroxyphenyl group linked to a C1-C5 alkylene group substituted with a hydroxyl group, a moiety containing a 3,4-dihydroxyphenyl group linked to an unsubstituted C1-C5 alkylene group, a moiety containing a 3,4-dihydroxyphenyl group linked to a C1-C5 heteroalkylene group substituted with a hydroxyl group, and a moiety containing a 3,4-dihydroxyphenyl group linked to an unsubstituted C1-C5 heteroalkylene group.

The moiety containing the dihydroxyphenyl group may be, for example, at least one selected from an amine containing a 3,4-dihydroxyphenyl group linked to a C1-C5 alkylene group substituted with a hydroxyl group, an amine containing a 3,4-dihydroxyphenyl group linked to an unsubstituted C1-C5 alkylene group, a methylamine containing a 3,4-dihydroxyphenyl group linked to a C1-C5 alkylene group substituted with a hydroxyl group, and a methylamine containing a 3,4-dihydroxyphenyl group linked to an unsubstituted C1-C5 alkylene group.

The moiety containing the dihydroxyphenyl group may be, for example, at least one selected from 2-(3,4-dihydroxyphenyl)ethyl-1-amine, 2-hydroxy-2-(3,4-di hydroxyphenyl) ethyl-1-amine, and 2-hydroxy-2-(3,4-di hydroxyphenyl) ethyl-1-methylamine.

The moiety containing the dihydroxyphenyl group may result in formation of a covalent bond, such as an amide bond, by a reaction with the carboxyl group included in the second repeating unit, or formation of an ionic compound, such as an ammonium carboxylate salt. When the moiety containing the dihydroxyphenyl group is an ammonium carboxylate salt, the ammonium cation may be a solvate. As used herein, the term "solvate" may refer to a complex between a solvent and a cation. Accordingly, the term "a solvate of the ammonium cation" may refer to a complex between the ammonium cation and the molecules of the solvent, for example, a complex between a cation derived from 2-(3,4-di hydroxyphenyl)ethyl-1-amine, 2-hydroxy-2-(3,4-di hydroxyphenyl)ethyl-1-amine, and 2-hydroxy-2-(3,4-dihydroxyphenyl)ethyl-1-methylamine and the molecules of the solvent.

The polymer may include a first repeating unit represented by Formula 1 below and a second repeating unit represented by Formula 2 below:

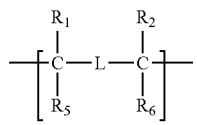

Formula 1

In Formula 1,

L may be selected from a single bond, a substituted or unsubstituted C1-C6 alkylene group, a substituted or unsubstituted C1-C6 heteroalkylene group, a substituted or unsubstituted C2-C6 alkenylene group, a substituted or unsubstituted C2-C6 alkynylene group, a substituted or unsubstituted C6-C10 arylene group, and a substituted or unsubstituted C6-C10 heteroarylene group;

$R_1$ and $R_2$ may be each independently selected from a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C7-C30 arylalkoxy group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C3-C30 heteroarylalkoxy group, a substituted or unsubstituted C4-C30 carbocyclic group, a substituted or unsubstituted C4-C30 carbocyclic oxy group, a substituted or unsubstituted C5-C30 carbocyclic alkyl group, a substituted or unsubstituted C5-C30 carbocyclic alkoxy group, a substituted or unsubstituted C2-C30 heterocyclic group, a substituted or unsubstituted C2-C30 heterocyclic oxy group, a substituted or unsubstituted C2-C30 heterocyclic alkyl group, and a substituted or unsubstituted C2-C30 heterocyclic alkoxy group; and $R_5$ and $R_6$ may be each independently selected from hydrogen, —C(=O)OH, and —C(=O)O-M, wherein M is selected from $Li^+$, $Na^+$, $K^+$, and $NH_4^+$, provided that at least one of $R_5$ and $R_6$ may be —C(=O)O-M.

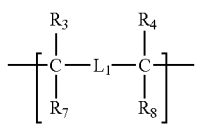

Formula 2

In Formula 2, $L_1$ may be selected from a single bond, a substituted or unsubstituted C1-C6 alkylene group, a substituted or unsubstituted C1-C6 heteroalkylene group, a substituted or unsubstituted C2-C6 alkenylene group, a substituted or unsubstituted C2-C6 alkynylene group, a substituted or unsubstituted C6-C10 arylene group, and a substituted or unsubstituted C6-C10 heteroarylene group;

$R_3$ and $R_4$ may be each independently selected from hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C7-C30 arylalkoxy group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C3-C30 heteroarylalkoxy group, a substituted or unsubstituted C4-C30 carbocyclic group, a substituted or unsubstituted C4-C30 carbocyclic oxy group, a substituted or unsubstituted C5-C30 carbocyclic alkyl group, a substituted or unsubstituted C5-C30 carbocyclic alkoxy group, a substituted or unsubstituted C2-C30 heterocyclic group, a substituted or unsubstituted C2-C30 heterocyclic oxy group, a substituted or unsubstituted C2-C30 heterocyclic alkyl group, and a substituted or unsubstituted C2-C30 heterocyclic alkoxy group; and $R_7$ and $R_8$ may be each independently selected from hydrogen, —C(=O)OH, an amide group substituted with $R_a$, and an ammonium carboxylate salt substituted with $R_a$, wherein $R_a$ may be a 3,4-dihydroxyphenyl group linked to an unsubstituted C1-C5 alkylene group, provided that at least one of $R_7$ and $R_8$ may be at least one selected from an amide group substituted with $R_a$ and an ammonium carboxylate salt substituted with $R_a$.

The polymer including the first repeating unit represented by Formula 1 and the second repeating unit represented by Formula 2 may have a weight average molecular weight in a range of about 100,000 Daltons to about 3,000,000 Daltons, for example, about 500,000 Daltons to about 3,000,000 Daltons or about 1,000,000 Daltons to about 3,000,000 Daltons. When the weight average molecular weight of the polymer is within these ranges, adhesion between negative electrode materials and adhesion of negative electrode materials to a current collector may be further improved.

The polymer may further include at least one of a third repeating unit represented by Formula 3 below and a fourth repeating unit represented by Formula 4 below:

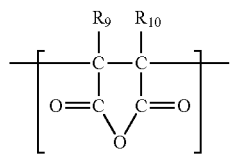

Formula 3

In Formula 3, $R_9$ and $R_{10}$ may be each independently selected from a hydrogen and a substituted or unsubstituted C1-C10 alkyl group.

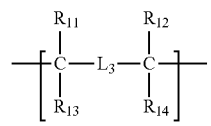

Formula 4

In Formula 4, $L_3$ may be selected from a single bond, a substituted or unsubstituted C1-C10 alkylene group, a substituted or unsubstituted C1-C10 heteroalkylene group, a substituted or unsubstituted C2-C10 alkenylene group, a substituted or unsubstituted C2-C10 alkynylene group, a substituted or unsubstituted C6-C10 arylene group, and a substituted or unsubstituted C6-C10 heteroarylene group; and $R_{11}$ to $R_{14}$ may be each independently selected from a hydrogen, —C(=O)OH, a substituted or unsubstituted C1-C10 alkyl group, and a substituted or unsubstituted C1-C10 alkoxy group.

The third repeating unit represented by Formula 3 includes a repeating group represented by Formula 3a below.

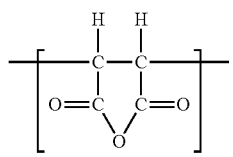

Formula 3a

The fourth repeating unit of Formula 4 includes a repeating group represented by any one of Formulae 4a to Formula 4e below.

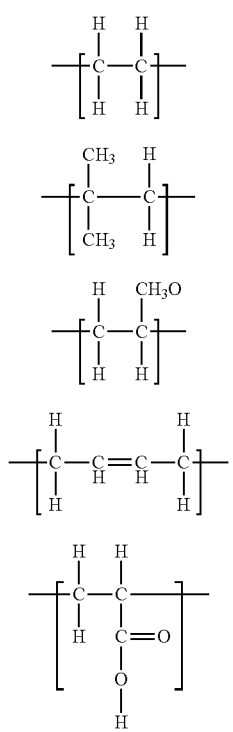

Formula 4a

Formula 4b

Formula 4c

Formula 4d

Formula 4e

The polymer including at least one of the third repeating unit represented by Formula 3, such as the repeating unit represented by Formula 3a, and the fourth repeating unit represented by Formula 4, such the repeating unit of any one of Formulae 4a to Formula 4e, in addition to the first repeating unit and the second repeating unit, may have a weight average molecular weight in a range of about 100,000 Daltons to about 3,000,000 Daltons, for example, about 500,000 Daltons to 3,000,000 Daltons or about 1,000,000 Daltons to about 3,000,000 Daltons. When the weight average molecular weight of the polymer is within these ranges, adhesion between negative electrode materials and adhesion of negative electrode materials to a current collector may be further improved.

The polymer may include, for example, at least one polymer represented by any one of Formulae 5 to 8 below, and may have a weight average molecular weight in a range of about 100,000 Daltons to about 3,000,000 Daltons:

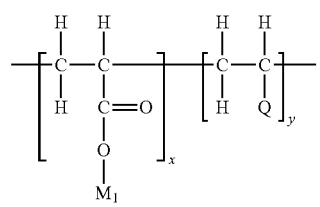

Formula 5

In Formula 5, x and y may each indicate a mole fraction, and $0<x<1$, $0<y<1$, provided that $x+y=1$;

$M_1$ may be at least one selected from $Li^+$, $Na^+$, $K^+$, and $NH_4^+$; and Q may be at least one selected from an amide group substituted with $R_b$ and an ammonium carboxylate salt substituted with $R_b$, wherein $R_b$ may be a 3,4-dihydroxyphenyl group linked to an unsubstituted C1-05 alkylene group.

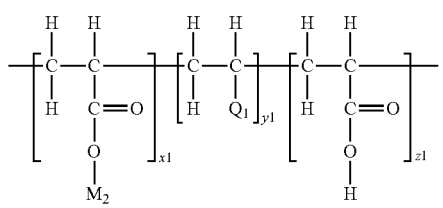

Formula 6

In Formula 6, $x_1$, $y_1$, and $z_1$ may each indicate a mole fraction, and $0<x_1<1$, $0<y_1<1$, $0<z_1<1$, provided that $x_1+y_1+z_1=1$;

$M_2$ may be at least one selected from $Li^+$, $Na^+$, $K^+$, and $NH_4^+$; and $Q_1$ may be at least one selected from an amide group substituted with $R_c$ and an ammonium carboxylate salt substituted with $R_c$, wherein $R_c$ may be a 3,4-dihydroxyphenyl group linked to an unsubstituted C1-C5 alkylene group.

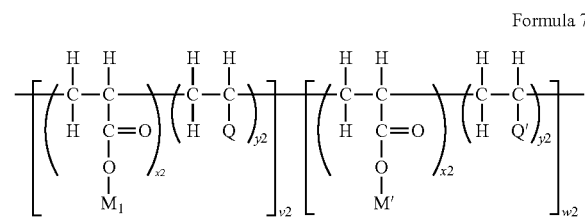

Formula 7

In Formula 7, $x_2$ and $y_2$ may each indicate a mole fraction, and $0<x_2<1$, $0<y_2<1$, provided that $x_2+y_2=1$;

$v_2$ and $w_2$ may each indicate a mole fraction and $0<v_2<1$, $0<w_2<1$, provided that $v_2+w_2=1$;

$M_1$ and $M'$ may be each independently at least one selected from $Li^+$, $Na^+$, $K^+$, and $NH_4^+$; and Q may be an amide group represented by $R_d$ and Q' may be an ammonium carboxylate salt substituted with $R_d$, wherein $R_d$ may be a 3,4-dihydroxyphenyl group linked to an unsubstituted C1-C5 alkylene group.

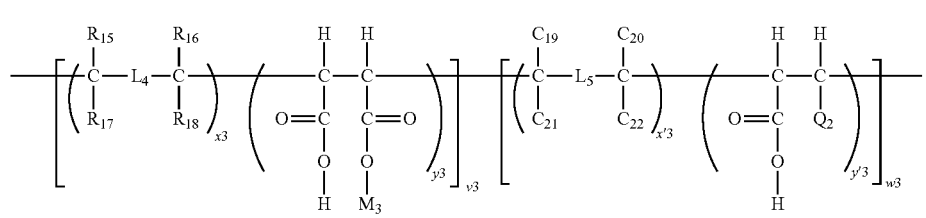

Formula 8

In Formula 8, $x_3$ and $y_3$ may each indicate a mole fraction, and $0<x_3<1$, $0<y_3<1$, provided that $x_3+y_3=1$;

$x'_3$ and $y'_3$ may each indicate a mole fraction, and $0<x'_3<1$, $0<y'_3<1$, provided that $x'_3+y'_3=1$;

$v_3$ and $w_3$ may each indicate a mole fraction, and $0<v_3<1$, $0<w_3<1$, provided that $v_3+w_3=1$;

$L_4$ and $L_5$ may be each independently selected from a single bond, a substituted or unsubstituted C1-C6 alkylene group, a substituted or unsubstituted C1-C6 heteroalkylene group, a substituted or unsubstituted C2-C6 alkenylene group, a substituted or unsubstituted C2-C6 alkynylene group, a substituted or unsubstituted C6-C10 arylene group, and a substituted or unsubstituted C6-C10 heteroarylene group;

$R_{15}$ to $R_{22}$ may be each independently selected from a hydrogen, a substituted or unsubstituted C1-C10 alkyl group, and a substituted or unsubstituted C1-C10 alkoxy group;

$M_3$ may be at least one selected from $Li^+$, $Na^+$, $K^+$, and $NH_4^+$; and $Q_2$ may be at least one selected from an amide group substituted with $R_d$ and an ammonium carboxylate salt substituted with $R_d$, wherein $R_d$ may be a 3,4-dihydroxyphenyl group linked to an unsubstituted C1-C5 alkylene group.

The polymers represented by Formulae 5 to 8 may include polymers represented by, for example, Formulae 5i, 5j, 7i, 8i, or 8j below, respectively.

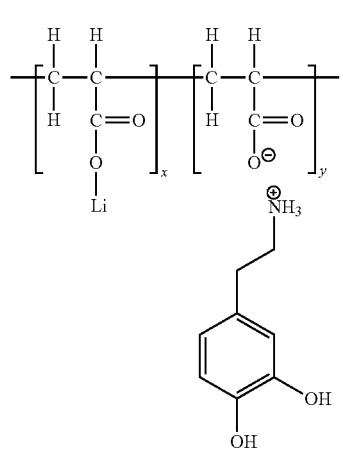

Formula 5i

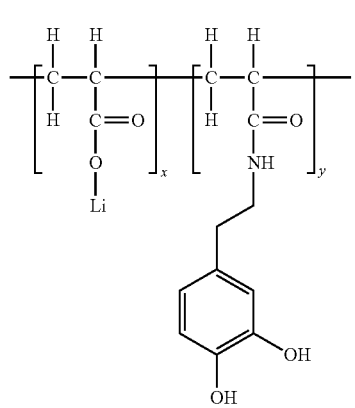

Formula 5j

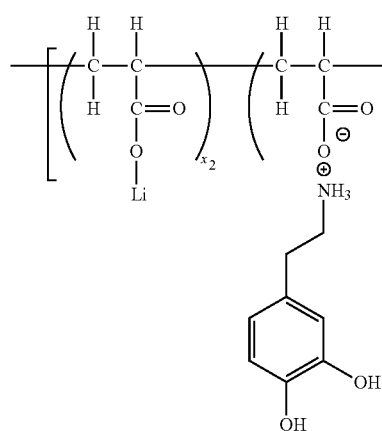

Formula 7i

-continued

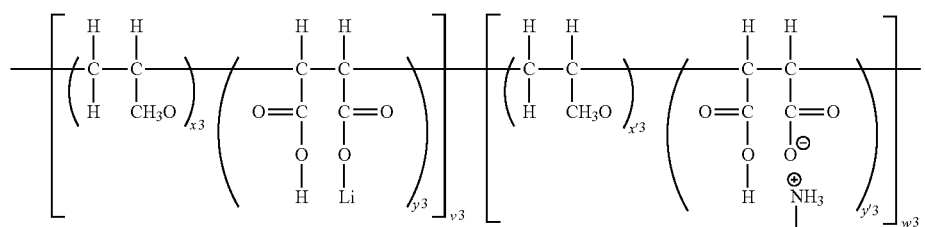

Formula 8i

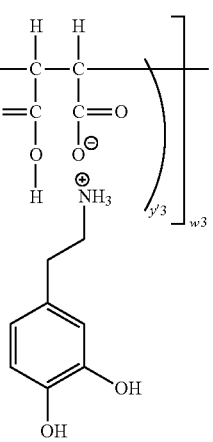

Formula 8j

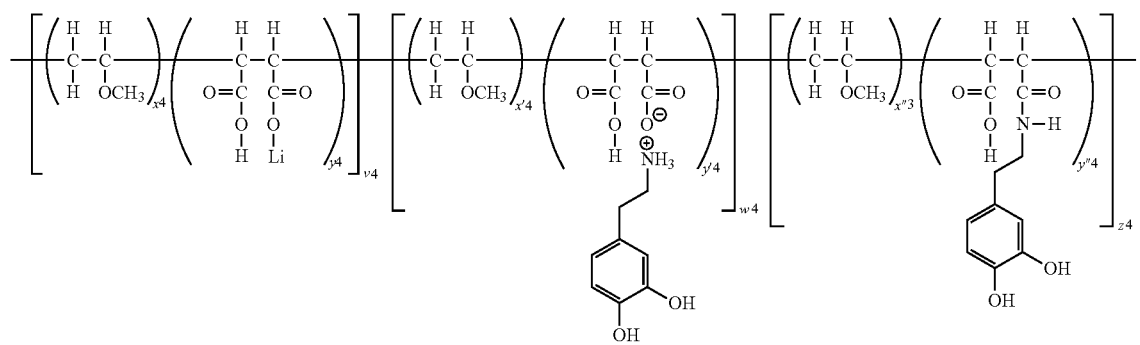

In Formulae 5i, 5j, 7i, 8i, and 8j, x, y, $x_2$, $y_2$, $x_3$, $y_3$, $x_4$, $y_4$, $x'_3$, $y'_3$, $x'_4$, $y'_4$, $x''_3$, $y''_4$, $v_2$, $w_2$, $v_3$, $w_3$, $v_4$, $w_4$, and $z_4$ may each indicate a mole fraction that is greater than 0 and less than 1, provided that each of the equations of x+y, $x_2+y_2$, $x_3+y_3$, $x'_3+y'_3$, $x_4+y_4$, $x^1_4+y'_4$, $x''_3+y''z_1$, $v_2+w_2$, $v_3+w_3$, and $v_4+w_4+z_4$ equals to 1.

The polymer may be an alternating polymer, a random polymer, or a block polymer, according to the composition and location of the first repeating unit and the second repeating unit.

A degree of substitution with the cation in the polymer may be in a range of about 0.2 to about 0.99 molar equivalents, for example, about 0.2 to about 0.95 molar equivalents or about 0.5 to about 0.8 molar equivalents. The term "a degree of substitution with the cation" used herein may be defined as follows. When a degree of polymerization of a polymer is denoted as t and the polymer has 2 carboxyl groups that may be substituted with the cation, a total number of the carboxyl groups that may be substituted with the cation may be denoted as 2t. A degree of substitution with the cation indicates a ratio of the carboxyl groups that are substantially substituted with the cation to 2t. For example, when the 2t is the number of the carboxyl groups substituted with the cation (in other words, when all carboxyl groups are substituted with the cation), a degree of substitution with the cation may be defined as 1. For example, when a degree of substitution with the cation is 0.6, it means that 2t×0.6 of the carboxyl groups are substituted with the cation of the total number of the carboxyl groups that may be substituted with the cation. In other words, a degree of substitution with the cation in the polymer refers to a number of molar equivalents of carboxyl groups that are substantially substituted with the cation based on 1 molar equivalent of the carboxyl groups that may be substituted with the cation in the polymer.

The degree of substitution with the cation may be controlled in order to obtain a polymer substituted with the cation within a desired range of the degree of substitution. This may be achieved by adjusting a molar ratio of an alkali source, e.g., LiOH, that is added for manufacturing the polymer.

The moiety including a dihydroxyphenyl group may be linked to the at least one carboxyl group of the second repeating unit through an ionic bond. In this case, a mole fraction of the second repeating unit in the polymer may be in a range of about 3 to about 70 mole percent (mol %), for example, about 5 to about 60 mol % or about 10 to about 50 mol %. On the other hand, the moiety comprising a dihydroxyphenyl group may be linked to the at least one carboxyl group of the second repeating unit through an amide bond. In this case, a mole fraction of the second repeating unit in the polymer may also be in a range of about 3 to about 70 mol %, for example, about 5 to about 60 mol % or about 10 to about 50 mol %. The mole fractions of the second repeating units in both cases may be determined by [1]H-Nuclear Magnetic Resonance (NMR) spectrum analysis which will be described below. When the mole fractions of the above second repeating units in a polymer are within these ranges, adhesion between negative electrode materials and adhesion of negative electrode materials to a current collector, as well as capacity of a lithium battery, may be further improved.

According to another aspect, there is provided a binder including the polymer.

The binder according to an embodiment may include the polymer including the first repeating unit including at least one carboxyl group substituted with the cation and the second repeating unit including the at least one carboxyl group substituted with the moiety containing the dihydroxyphenyl group. The polymer includes at least one carboxyl group substituted with the moiety containing the dihydroxyphenyl group, and accordingly, adhesion between negative electrode materials included in the negative electrode active material layer and adhesion of negative electrode materials to a current collector may be improved. In addition, the polymer includes at least one carboxyl group substituted with the cation, and accordingly, the polymer may also form an organic free pre-solid electrolyte interface (SEI) film on a surface of the negative electrode active material to protect a binding to the negative active material. In this regard, the polymer may prevent a direct contact between the negative electrode active material and an electrolyte, and accordingly, side reactions between the negative active material and the electrolyte may be suppressed to such extent that capacity and lifetime of a lithium battery including the polymer as a binder may be improved.

In some embodiments, the binder including a polymer that includes at least one carboxyl group substituted with the cation may cause, in manufacturing of a negative electrode, a partial exfoliation of the negative electrode active material layer on a partial surface of a current collector. Accordingly, capacity and lifetime of a lithium battery including the polymer as the binder may be diminished. In addition, the binder including the polymer that includes at least one carboxyl group substituted with the moiety containing the dihydroxyphenyl group only may cause that carboxyl group to react with an amine group of the moiety containing the dihydroxyphenyl group and may be changed to an ammonium carboxylate salt in manufacturing a negative electrode. As a result, the viscosity of the polymer solution may be rapidly decreased, causing a problem that a slurry for forming an electrode may not be formed.

The binder may be, for example, manufactured in the following manner.

A source for the cation, e.g., anhydrous LiOH, is dissolved in a water-based (water-comprising) solvent, and a polymer that includes a chain including a carboxyl group is added thereto so as to obtain a polymer solution in which at least one carboxyl group is substituted with the cation. Then, a moiety containing a dihydroxyphenyl group, for example, a moiety including an dihydroxyphenyl group linked to an amino group, such as 2-(3,4-dihydroxyphenyl)ethyl-1-amine, 2-hydroxy-2-(3,4-di hydroxyphenyl)ethyl-1-amine, or 2-hydroxy-2-(3,4-dihydroxyphenyl)ethyl-1-methylamine, is added to the polymer solution to carry out a reaction therebetween. Subsequently, a water-based solvent is added thereto so as to obtain a polymer including a first repeating unit in which at least one carboxyl group is substituted with the cation and a second repeating unit including at least one carboxyl group is substituted with a moiety containing the dihydroxyphenyl group.

A content of the water-based solvent may be in a range of about 100 to about 5,000 parts by weight based on 100 parts by weight of the polymer, but the content of the water-based solvent may be adjusted to prepare a polymer having a suitable viscosity.

According to another aspect, there is provided a negative electrode including the binder described above and a negative electrode active material.

A content of the binder may be in a range of about 0.5 to about 20 parts by weight based on 100 parts by weight of the negative electrode active material. Here, the content of the binder may be appropriately adjusted according to a type of the negative electrode active material used. For example, when a carbonaceous material is used as the negative electrode active material, a content of the binder may be in a range of about 0.5 to about 10 parts by weight based on 100 parts by weight of the negative electrode active material. For example, the content of the binder may be in a range of about 0.5 to about 5 parts by weight or about 1 to about 2 parts by weight, based on 100 parts by weight of the negative electrode active material.

The negative electrode active material may include at least one selected from a carbonaceous material, silicon, silicon oxide, a silicon alloy, tin, tin oxide, and a tin alloy.

The carbonaceous material may include crystalline carbon, amorphous carbon, or a combination thereof. Examples of the crystalline carbon are graphite, such as natural graphite or artificial graphite that are in amorphous, plate, flake, spherical or fibrous form, and examples of the amorphous carbon are soft carbon (i.e., carbon sintered at low temperatures), hard carbon, meso-phase pitch carbide, and a sintered cork.

The silicon, silicon oxide, silicon alloy, tin, tin oxide, or tin alloy may be, for example, Si, $SiO_x$ (wherein 0<x<2), a Si—Y alloy (wherein Y may be an alkali metal, alkaline earth metal, elements of Groups 13 to 16, transition metal, rare earth element, or a combination thereof, but may not be Si), Sn, $SnO_2$, a Sn—Y alloy (wherein Y may be an alkaline metal, alkaline earth metal, elements of Groups 13 to 16, transition metal, rare earth element, or a combination thereof, but may not be Sn), or the like. In addition, at least one of these materials may be used in a mixture of $SiO_2$. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The negative electrode may further include a water-based binder. The water-based binder may include at least one selected from styrene-butadiene rubber (SBR), carboxymethylcellulose (CMC), sodium-carboxymethylcellulose (Na-CMC), polyacrylic acid (PAA), polyvinylalcohol (PVA), hydroxypropylene cellulose, and diacetylene cellulose. For example, the water-based binder may include at least one selected from SBR, CMC, and Na-CMC.

A content of the water-based binder may be in a range of about 1 to about 15 parts by weight based on 100 parts by weight of the negative electrode active material. The content of the water-based binder may be appropriately adjusted according to a type of the negative electrode active material used. For example, when a carbonaceous material is used as the negative electrode active material, the content of the water-based binder may be in a range of about 5 to about 15 parts by weight, for example, about 1 to about 5 parts by weight or about 1.5 to about 3 parts by weight, based on 100 parts by weight of the negative electrode active material.

The negative electrode may be, for example, manufactured in the following manner.

The negative electrode may be manufactured by coating a current collector, for example, a copper current collector, with a composition including the negative electrode active material, the binder, and the water-based binder. In some embodiments, the composition may further include a conducting agent. The coating of the negative electrode may be performed by screen printing, spray coating, coating using a doctor blade, Gravure coating, dip coating, silk screen, or coating using a slot die. However, the coating method is not limited thereto, and any coating method available in the art may be used.

When the composition is coated on the current collector, such as a copper current collector, the composition is dried at a temperature of about 80° C. to about 120° C. (a first heat treatment) to remove the water-based solvent, and then, is roll-pressed and dried again to obtain a negative electrode. When a catalyst is included, the drying by the first heat treatment may be performed at a temperature of about 60° C. to about 90° C. to obtain a negative electrode.

The current collector is not limited to materials, shapes, or manufacturing methods thereof, and any suitable current collector available in the art may be used. For example, the current collector may include a copper foil having a thickness in a range of about 10 to about 100 micrometers (μm), a perforated copper foil having a thickness in a range of about 10 to about 100 μm and a hole diameter in a range of about 0.1 to about 10 mm, expanded metal, or an expanded metal plate. Materials for forming the negative electrode current collector may further include stainless steel, titanium, or nickel. In some embodiments, a plasticizer may be further added to the composition to enable the formation of pores within a negative electrode plate.

According to another aspect, there is provided a lithium battery including the negative electrode described above.

The lithium battery may be, for example, manufactured in the following manner.

First, the negative electrode may be manufactured as described above.

Then, a positive electrode may be manufactured as follows.

A positive electrode active material, a conducting agent, a binder, and a solvent are mixed together to prepare a positive electrode active material composition. The positive electrode active material composition may be directly coated on the current collector, and then, dried so as to manufacture a positive electrode having a positive electrode active material layer formed on the current collector. Alternatively, the positive electrode active material composition may be cast on a separate support, and then, a film obtained by exfoliation from the support may be laminated on the current collector so as to manufacture a positive electrode having a positive electrode active material layer formed on the current collector.

The positive electrode active material may be any suitable material that is used in a positive electrode in the art and is capable of intercalation and deintercalation of lithium ions. The positive electrode active material capable of intercalation and deintercalation of lithium ions is not particularly limited, and examples thereof include compounds represented by any one of Formulae $Li_aA_{1-b}B'_bD'_2$ (wherein $0.90 \leq a \leq 1.8$ and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{2-c}D'_c$ (wherein $0 \leq b \leq 0.5$ and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.8$, $0 \leq b \leq 0.9$, $0 \leq c \leq 0.5$, $0 \leq d$ $0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $LiQO_2$; $LiQS_2$; $LiV_2O_5$; $LiI'O_2$; $LiNiVO_4$; $Li_{(3-f)}J_2(PO_4)_3 (0 \leq f \leq 2)$; $Li_{(3-f)}Fe_2(PO_4)_3$ (wherein $0 \leq f \leq 2$); and $LiFePO_4$.

In the formulas, A is at least one selected from Ni, Co, and Mn; B' is at least one selected from Al, Ni, Co, Mn, Cr, Fe, Mg, Sr, V, and a rare earth element; D' is at least one selected from O, F, S, and P; E is at least one selected from Co and Mn; X is at least one selected from F, S, and P; G is at least one selected from Al, Cr, Mn, Fe, Mg, La, Ce, Sr, and V; Q is at least one selected from Ti, Mo, and Mn; I' is Cr, V, Fe, Sc, and Y; and J is at least one selected from V, Cr, Mn, Co, Ni, and Cu.

The conducting agent may include carbon black, graphite, natural graphite particulates, artificial graphite, acetylene black, ketjen black, carbon fiber, carbon nano tube, or metal powder, metal fiber, or metal tube of copper, nickel, aluminum, or silver; or a conductive polymer such as a polyphenylene derivative, but is not limited thereto. Any conducting agent available in the art may be used.

The binder may include, for example, vinylidene fluoride/hexafluoropropylene copolymer, polyvinylidene fluoride (PVDF), polyacrylonitrile, polymethylmethacrylate, polytetrafluoroethylene (PTFE), a mixture of the polymers, or a SBR polymer.

In addition, the binder may include, for example, polysaccharides, such as starch, methylcellulose, carboxymethylcellulose, hydroxymethylcellulose, hydroxyethylcellulose, hydroxypropylcellulose, carboxymethylhydroxyethylcellulose, nitrocellulose, and derivatives thereof; phenol resin; melamine resin; polyurethane resin; urea resin; polyamide resin; polyimide resin; polyamide-imide resin; petroleum pitch; or coal pitch. The binder may include a plurality of binders, and may be used as a thickening agent in an electrode material mixture.

The solvent may include N-methylpyrrolidone (NMP), acetone, or water, but is not limited thereto. Any suitable solvent available in the art may be used.

The current collector may include, for example, a metal such as nickel, aluminum, titanium, copper, gold, silver, platinum, an aluminum alloy, or stainless steel, for example, a carbon material, activated carbon fiber, formation by plasma spraying or arc using nickel, aluminum, zinc, copper, tin, lead, or an alloy thereof, or for example, a conductive film formed from a conducting agent dispersed in resins such as rubber or styrene-ethylene-butylene-styrene copolymer (SEBS). In some embodiments, the current collector may be made of aluminum, nickel, or stainless steel. In particular, aluminum may be used due to the ease of processing into a thin film and low cost. A shape of the current collector is not particularly limited, and thus, the current collector may be used in any of a variety of forms, such as thin films, flat sheets, mesh, nets, punching, embossing, or a combination thereof (e.g., a mesh-shaped flat sheet or the like). For example, a surface of the current collector may not be even due to an etching process.

The positive electrode active material, the conducting agent, the binder, and the solvent may be included in a lithium battery in a content ordinarily used in the art. According to use and configuration of a lithium battery, one or more of the conducting agent, the binder, and the solvent may be omitted. In some embodiments, a plasticizer may be further added to the positive electrode active material composition to enable formation of pores within an electrode plate.

Next, a separator to be disposed between the positive electrode and the negative electrode may be prepared. Any suitable separator available in the art for a lithium battery may be used. For example, a separator having low resistance against the movement of electrolyte ions and excellent moisture retention capability in an electrolyte may be used. Such a separator may be made of materials selected from glass fiber, polyester, Teflon, polyethylene, polypropylene, polytetrafluoroethylene (PTFE), and a combination thereof, and may be used in a non-woven or woven form. For example, a separator that is made of polyethylene or polypropylene and is windable may be used in a lithium ion battery. Regarding an electrolyte in a lithium ion polymer battery, a separator particularly having excellent moisture retention capability in an organic electrolyte may be used.

The separator may be a separator including an organic electrolytic solution described below.

For example, the separator may be, for example, manufactured in the following manner.

A polymer resin, a filler, and a solvent may be mixed together to prepare a separator composition. The separator composition may be directly coated on the top surface of an electrode, and dried, so as to form a separator. Alternatively, the separator composition may be cast on a support, dried, and a separator film obtained by exfoliation from the support may be laminated on the top surface of the electrode, so as to form a separator.

The polymer resin used in manufacturing the separator is not particularly limited, and any material used in a binder for an electrode plate may be used. For example, the separator may include vinylidene fluoride/hexafluoropropylene copolymer, PVDF, polyacrylonitrile, polymethylmethacrylate, or a combination thereof.

Next, an electrolyte may be prepared.

For example, the electrolyte may be an organic electrolyte solution. Alternatively, the electrolyte may be in a solid form. For example, the electrolyte may include boron oxide or lithium oxynitride, but is not limited thereto. Here, any solid electrolyte available in the art may be used. The solid electrolyte may be formed on the negative electrode according to a sputtering method.

For example, an organic electrolytic solution may be prepared herein. The organic electrolytic solution may be prepared by dissolving a lithium salt in an organic solvent.

Here, any organic solvent available in the art may be used. For example, the organic solvent may include propyl carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyl dioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

Here, any lithium salt available in the art may be used. For example, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a mixture thereof. A concentration of the lithium salt may be suitably within a range of about 0.1 to about 2.0 molar (M). When the concentration of the lithium salt is within this range, the electrolytic solution may also have conductivity and viscosity suitable enough to exhibit excellent performance of the electrolytic solution. Accordingly, the movement of lithium ions may effectively occur.

FIG. 1 is an exploded perspective view of a lithium battery 100 according to an embodiment.

Referring to FIG. 1, the lithium battery 100 may include, in detail, a positive electrode 114, a separator 113, and a negative electrode 112. These positive electrode 114, separator 113, and negative electrode 112 may be wound or folded, to be accommodated in a battery case 120. Then, the battery case 120 is filled with an organic electrolytic solution and sealed by a sealing member 140, thereby completing the manufacture of the lithium battery 100. The battery case 120 may be a cylindrical type, a rectangular type, or a thin-film type. For example, the lithium battery 100 may be a large-sized thin-film type battery.

The lithium battery 100 may be a flexible lithium secondary battery.

The separator 113 may be disposed between the positive electrode 114 and the negative electrode 112 to form a battery assembly. The battery assembly may be stacked in the form of a bi-cell structure and impregnated with the organic electrolytic solution. The resultant may be put into a pouch and sealed, thereby completing the manufacture of a lithium ion polymer battery. In addition, a plurality of the battery assemblies may be stacked to form a battery pack, which may be used in any device that requires high capacity and high output. For example, the lithium battery 100 may be used in a laptop computer, a smart phone, or an electric vehicle (EV). Also, the lithium battery 100 may be applied to a hybrid vehicle such as plug-in hybrid electric vehicle (PHEV).

Hereinafter, substituents in all of the Formulae above may be defined as follows.

In all of the Formulae above, the term "substituted" used with the alkylene group, the alkyl group, the alkoxy group, the alkenyl group, the alkenylene group, the alkynyl group, the alkynylene group, the arylene group, the aryl group, the aryloxy group, the arylalkyl group, the heteroaryl group, the heteroaryloxy group, the heteroarylalkyl group, the heterocyclic group, the heterocyclic alkyl group, the carbocyclic group, or the carbocyclic alkyl group refers to a halogen atom or a C1-C20 alkyl group substituted with a halogen atom (e.g., $CF_3$, $CHF_2$, $CH_2F$, or $CCl_3$), a hydroxyl group, a nitro group, a cyano group, an amino group, an amidino group, a hydrazine group, a hydrazone group, a carboxyl group or a salt thereof, a sulfonic acid group or a salt thereof, a phosphoric acid group or a salt thereof, or a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

The term "alkyl group" as used herein in a chemical formula refers to a monovalent fully saturated branched or unbranched (or straight chain or linear) hydrocarbon group. Examples of the term "alkyl group" used in the Formula above are methyl, ethyl, propyl, isobutyl, sec-butyl, tert-butyl, neo-butyl, iso-amyl, or hexyl group.

The term "alkylene group" as used herein in a chemical formula refers to a divalent fully saturated branched or unbranched (or straight chain or linear) hydrocarbon group. Examples of the term "alkylene group" used in the Formulae above are methylene, ethylene, propylene, isobutylene, sec-butylene, tert-butylene, neo-butylene, iso-amylene, hexylene group, or the like.

The term "heteroalkylene group" as used herein in a chemical formula refers to a divalent fully saturated branched or unbranched (or straight chain or linear) hydrocarbon group having at least one heteroatom selected from N, O, P, and S and carbon as remaining atoms. Examples of the term "heteroalkylene group" used in the Formulae above are ethyleneoxyethylene, or the like.

The term "alkoxy group" as used herein in a chemical formula refers to alkyl-O—, wherein the alkyl group is as described above. Examples of the term "alkoxy group" used in the Formulae above are methoxy, ethoxy, propoxy group, or the like.

The term "alkenyl group" as used herein in a chemical formula refers to a branched or non-branched monovalent hydrocarbon group having at least one carbon-carbon double bond. Examples of the term "alkenyl group" used in the Formulae above are vinyl, allyl group, or the like.

The term "alkenylene group" as used herein in a chemical formula refers to a branched or non-branched divalent hydrocarbon group having at least one carbon-carbon double bond. Examples of the term "alkenylene group" used in the Formulae above are vinylene, allylene group, or the like.

The term "alkynyl group" as used herein in a chemical formula refers to a branched or non-branched monovalent hydrocarbon group having at least one carbon-carbon triple bond. Examples of the term "alkynyl group" used in the Formulae above are acetyl group, or the like.

The term "alkynylene group" as used herein in a chemical formula refers to a branched or non-branched divalent hydrocarbon group having at least one carbon-carbon triple bond. Examples of the term "alkynylene group" used in the Formulae above are acetylene group or the like.

As used in formula above, the term "aryl group", which is used alone or in combination, indicates a monovalent aromatic system including at least one ring. Examples of the term "aryl group" are phenyl, naphthyl, tetrahydronaphthyl group, or the like.

As used in the Formulae above, the term "arylene group", which is used alone or in combination, indicates a divalent aromatic system including at least one ring, and examples thereof are phenylene, naphthylene, tetrahydronaphthylene group, or the like.

The term "aryloxy group" as used in a chemical formula refers to O-aryl group. Detailed examples of the term "aryloxy group" used in the Formulae above are phenoxy group or the like.

The term "arylalkyl group" as used herein in a chemical formula refers to an alkyl group substituted with an aryl group. Detailed examples of the term "arylalkyl group" used in the Formulae above are phenylmethyl, phenylethyl, naphthylmethyl, naphthylethyl, tetrahydronaphthylmethyl, tetrahydronaphthylethyl group, or the like.

The term "arylalkoxy group" as used herein in a chemical formula refers to arylalkyl-O group. Detailed examples of the term "arylalkoxy group" used in the Formulae above are benzyloxy or the like.

The term "heteroaryl group" as used in the Formulae above refers to a monovalent group derived from an organic compound having at least one heteroatom selected from N, O, P, and S and carbon as remaining cyclic atoms. Detailed examples of the term "heteroarylene group" used in the Formulae above are pyridyl group or the like.

The term "heteroarylene group" as used in the Formulae above refers to a divalent group derived from an organic compound having at least one heteroatom selected from N, O, P, and S and carbon as remaining cyclic atoms. Detailed examples of the term "heteroarylene group" used in the Formulae above are pyridylene group or the like.

The term "heteroaryloxy group" as used in the Formulae above refers to an O-heteroaryl moiety. Detailed examples of the term "heteroaryloxy group" used in the Formulae above are 2-pyridyloxy or the like.

The term "heteroarylalkyl group" used in the Formulae above refers to an alkyl group substituted with a heteroaryl group. Detailed examples of the term "heteroarylalkyl group" used in the Formulae above are 2-pyridylmethyl and the like.

The term "heteroarylalkoxy group" as used herein in a chemical formula refers to heteroarylalkyl-O group. Detailed examples of the term "heteroarylalkoxy group" used in the Formulae above are 2-pyridylmethyloxy or the like.

The term "heterocyclic group" used in the Formulae above refers to a cyclic group having at least one heteroatom selected from N, O, P, and S and 5 to 10 carbon atoms. Detailed examples of the term "heterocyclic group" used in the Formulae above are 3-tetrahydrofuranyl or the like.

The term "heterocyclic oxy group" as used herein in a chemical formula refers to heterocyclic-O group. Detailed examples of the term "heterocyclic oxy group" used in the Formulae above are 3-tetrahydrofuranyloxy or the like.

The term "heterocyclic alkyl group" used in the Formulae above refers to a cyclic group in which at least one hydrogen atom of the heterocyclic group is substituted with an alkyl group. Detailed examples of the term "heterocyclic alkyl group" used in the Formulae above are 3-tetrahydrofuranylmethyl or the like.

The term "heterocyclic alkoxy group" as used herein in a chemical formula refers to heterocyclic alkyl-O group. Detailed examples of the term "heterocyclic alkoxy group" used in the Formulae above are 3-tetrahydrofuranylmethyloxy or the like.

The term "carbocyclic group" used in the Formulae above refers to a saturated or partially unsaturated non-aromatic monocyclic, bicyclic, or tricyclic hydrocarbon group. Detailed examples of the term "carbocyclic group" used in the Formulae above are cyclohexyl or the like.

The term "carbocyclic oxy group" as used herein in a chemical formula refers to carbocyclic-O group. Detailed examples of the term "carbocyclic oxy group" used in the Formulae above are cyclohexyloxy or the like.

The term "carbocyclic alkyl group" used in the Formulae above refers to a cyclic group in which at least one hydrogen atom of the carbocyclic group is substituted with an alkyl group. Detailed examples of the term "carbocyclic alkyl group" used in the Formulae above are cyclohexylmethyl or the like.

The term "carbocyclic alkoxy group" as used herein in a chemical formula refers to carbocyclic alkyl-O group. Detailed examples of the term "carbocyclic alkoxy group" used in the Formulae above are cyclohexylmethyloxy or the like.

Hereinafter, one or more embodiments will be described in more detail with reference to the following examples. However, these examples are for illustrative purposes only and are not intended to limit the scope of the one or more embodiments.

In addition, contents that may be obviously inferred by one of ordinary skill in the art are not described herein.

EXAMPLE

Preparation of Polymer Containing Binder

Preparation Example 1

Preparation of Polymer Containing Binder 0.170 grams (g) of LiOH anhydride was dissolved in 199 g of deionized water to prepare a LiOH solution, and 1 g of a polymer, i.e., polyacrylic acid (PAA) (Mv: 1,250,000, available from Aldrich company), was added to the LiOH solution so as to prepare a lithium ion substituted PAA solution (Li-0.5-PAA) wherein a degree of substitution (DS) with a lithium ion in the PAA was 0.5. That is, the DS in the lithium ion substituted PAA solution (Li-0.5-PAA) refers to 0.5 molar equivalents of carboxyl groups that have been substituted with lithium ions based on 1 molar equivalent of total carboxyl groups that may be substituted with lithium ions in the polymer. 1.317 g of 3,4-dihydroxyphenylamine (DOPA) hydrochloride at a ratio of 0.5 molar equivalents based on 1 molar equivalent of carboxyl groups in the lithium ion substituted PAA was added to the lithium ion substituted PAA solution (Li-0.5-PAA) therein so as to prepare a mixture, and the mixture was stirred. Then, 77.77 g of deionized water was added to the stirred mixture, thereby preparing a binder solution containing the PAA (Li-0.5-PAA-0.5-DOPA) which is represented by Formula 5a below and includes a first repeating unit including a carboxyl group substituted with a lithium ion and a second repeating unit including a 3,4-dihydroxyphenylamine ammonium carboxylate salt.

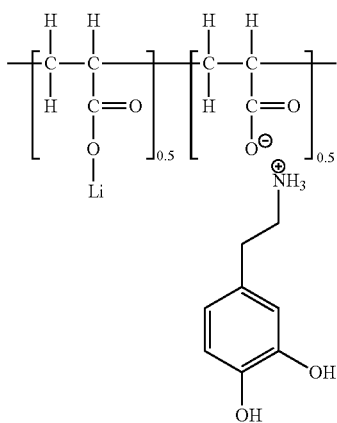

Formula 5a

Here, the content of the 3,4-dihydroxyphenylamine ammonium carboxylate salt in the PAA containing binder solution (Li-0.5-PAA-0.5-DOPA) was 61.1 mol %.

Preparation Example 2

Preparation of Polymer Containing Binder 0.204 g of LiOH anhydride was dissolved in 199 g of deionized water to prepare a LiOH solution, and 1 g of a polymer, i.e., polyacrylic acid (PAA) (Mv: 1,250,000, available from Aldrich company), was added to the LiOH solution so as to prepare a lithium ion substituted PAA solution (Li-0.6-PAA) wherein a DS with a lithium ion in the PAA was 0.6. That is, the DS in the lithium ion substituted PAA solution (Li-0.6-PAA) refers to 0.6 molar equivalents of carboxyl groups that have been substituted with lithium ions based on 1 molar equivalent of total carboxyl groups that may be substituted with lithium ions in the polymer. 1.052 g of 3,4-dihydroxyphenylamine hydrochloride at a ratio of 0.4 molar equivalents based on 1 molar equivalent of carboxyl groups in the lithium ion substituted PAA was added to the lithium ion substituted PAA solution (Li-0.6-PAA) therein so as to prepare a mixture, and the mixture was stirred. Then, 49.15 g of deionized water was added to the stirred mixture, thereby preparing a binder solution containing the PAA (Li-0.6-PAA-0.4-DOPA) which is represented by Formula 5b below and includes a first repeating unit including a carboxyl group substituted with a lithium ion and a second repeating unit including a 3,4-dihydroxyphenylamine ammonium carboxylate salt.

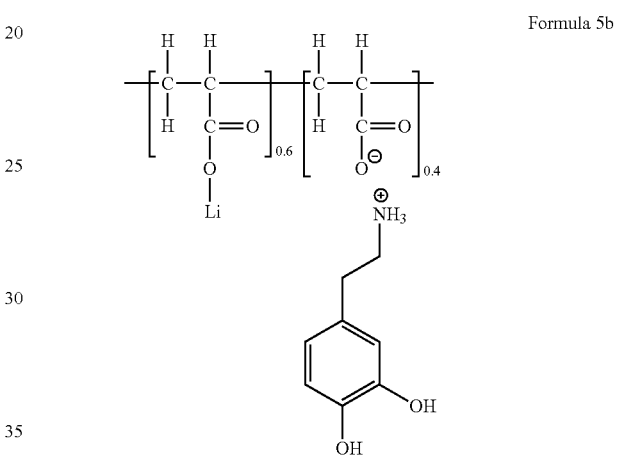

Formula 5b

Here, the content of the 3,4-dihydroxyphenylamine ammonium carboxylate salt in the PAA containing binder solution (Li-0.6-PAA-0.4-DOPA) was 37.3 mol %.

Preparation Example 3

Preparation of Polymer Containing Binder 0.237 g of LiOH anhydride was dissolved in 199 g of deionized water to prepare a LiOH solution, and 1 g of a polymer, i.e., polyacrylic acid (PAA) (Mv: 1,250,000, available from Aldrich company), was added to the LiOH solution so as to prepare a lithium ion substituted PAA solution (Li-0.7-PAA) wherein a DS with a lithium ion in the PAA was 0.7. That is, the DS in the lithium ion substituted PAA solution (Li-0.7-PAA) refers to 0.7 molar equivalents of carboxyl groups that have been substituted with lithium ions based on 1 molar equivalent of total carboxyl groups that may be substituted with lithium ions in the polymer. 0.789 g of 3,4-dihydroxyphenylamine hydrochloride at a ratio of 0.3 molar equivalents based on 1 molar equivalent of carboxyl groups in the lithium ion substituted PAA was added to the lithium ion substituted PAA solution (Li-0.7-PAA) therein so as to prepare a mixture, and the mixture was stirred. Then, 20.67 g of deionized water was added to the stirred mixture, thereby preparing a binder solution containing the PAA (Li-0.7-PAA-0.3-DOPA) which is represented by Formula 5c below and includes a first repeating unit including a carboxyl group substituted with a lithium ion and a second repeating unit including a 3,4-dihydroxyphenylamine ammonium carboxylate salt.

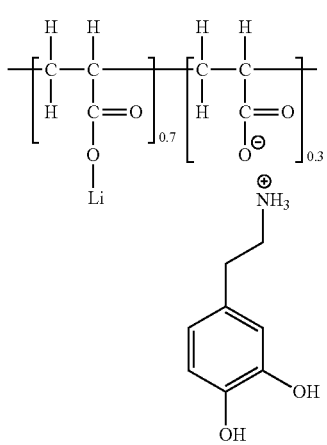

Formula 5c

Here, the content of the 3,4-dihydroxyphenylamine ammonium carboxylate salt in the PAA containing binder solution (Li-0.7-PAA-0.3-DOPA) was 34.5 mol %.

Preparation Example 4

Preparation of Polymer Containing Binder 0.271 g of LiOH anhydride was dissolved in 199 g of deionized water to prepare a LiOH solution, and 1 g of a polymer, i.e., polyacrylic acid (PAA) (Mv: 1,250,000, available from Aldrich company), was added to the LiOH solution so as to prepare a lithium ion substituted PAA solution (Li-0.8-PAA) wherein a DS with a lithium ion in the PAA was 0.8. That is, the DS in the lithium ion substituted PAA solution (Li-0.8-PAA) refers to 0.8 molar equivalents of carboxyl groups that have been substituted with lithium ions based on 1 molar equivalent of total carboxyl groups that may be substituted with lithium ions in the polymer. 0.526 g of 3,4-dihydroxyphenylamine hydrochloride at a ratio of 0.2 molar equivalents based on 1 molar equivalent of carboxyl groups in the lithium ion substituted PAA was added to the PAA solution (Li-0.8-PAA) therein so as to prepare a mixture, and the mixture was stirred. Then, 5.05 g of deionized water was added to the stirred mixture, thereby preparing a binder solution containing the PAA (Li-0.8-PAA-0.2-DOPA) which is represented by Formula 5d below and includes a first repeating unit including a carboxyl group substituted with a lithium ion and a second repeating unit including a 3,4-dihydroxyphenylamine ammonium carboxylate salt.

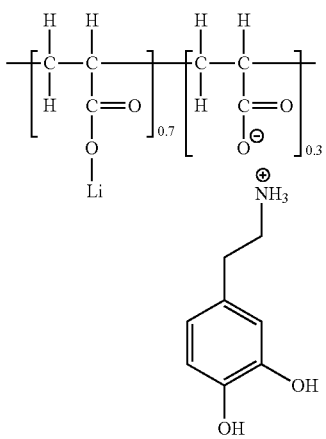

Formula 5d

Here, the content of the 3,4-dihydroxyphenylamine ammonium carboxylate salt in the PAA containing binder solution (Li-0.8-PAA-0.2-DOPA) was 23.6 mol %.

Preparation Example 5

Preparation of Polymer Containing Binder 0.140 g of LiOH anhydride was dissolved in 99 g of deionized water to prepare a LiOH solution, and 1 g of a polymer, i.e., poly(methyl vinyl ether-alt-maleic acid) (PMVEMAn) (Mn: 960,000, available from Aldrich company), was added to the LiOH solution so as to prepare a lithium ion substituted PMVEMAn solution (Li-0.5-PMVEMAn) wherein a DS with a lithium ion in the PMVEMAn was 0.5. That is, the DS in the lithium ion substituted PMVEMAn solution (Li-0.5-PMVEMAn) refers to 0.5 molar equivalents of carboxyl groups that have been substituted with lithium ions based on 1 molar equivalent of total carboxyl groups that may be substituted with lithium ions in the polymer. 1.10 g of 3,4-dihydroxyphenylamine hydrochloride at a ratio of 0.5 molar equivalents based on 1 molar equivalent of carboxyl groups in the lithium ion substituted PMVEMAn was added to the lithium ion substituted PMVEMAn solution (Li-0.5-PMVEMAn) therein so as to prepare a mixture, and the mixture was stirred, thereby preparing a binder solution containing the PMVEMAn (Li-0.5-PMVEMAn-0.5-DOPA) which is represented by Formula 8a below and includes a first repeating unit including a carboxyl group substituted with a lithium ion and a second repeating unit including a 3,4-dihydroxyphenylamine ammonium carboxylate salt.

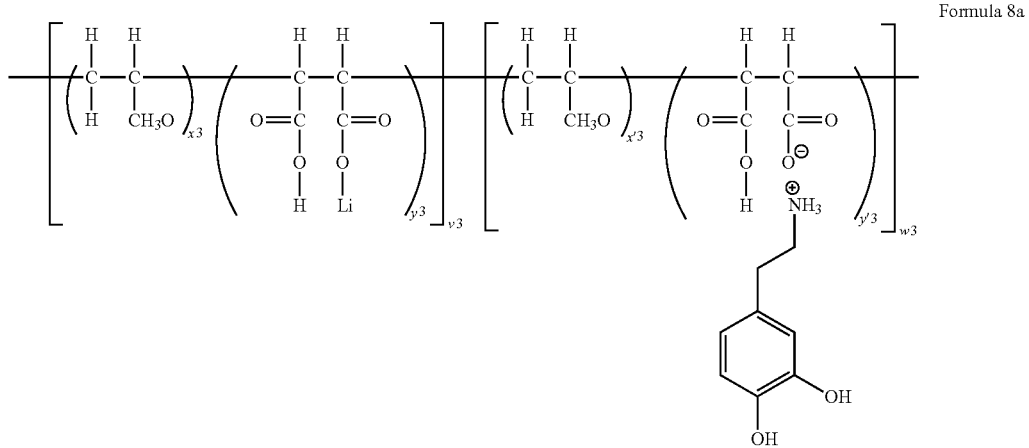

Formula 8a

Here, the content of the 3,4-dihydroxyphenylamine ammonium carboxylate salt in the PMVEMAn containing binder solution (Li-0.5-PMVEMAn-0.5-DOPA) was 9.33 mol %.

Preparation Example 6

Preparation of polymer containing binder 0.224 g of LiOH anhydride was dissolved in 99 g of deionized water to prepare a LiOH solution, and 1 g of a polymer, i.e., poly(methyl vinyl ether-alt-maleic acid) (PMVEMAn) (Mn: 960,000, available from Aldrich company), was added to the LiOH solution so as to prepare a lithium ion substituted PMVEMAn solution (Li-0.8-PMVEMAn) wherein a DS with a lithium ion in the PMVEMA was 0.8. That is, the DS in the lithium ion substituted PMVEMAn solution (Li-0.8-PMVEMAn) refers to 0.8 molar equivalents of carboxyl groups that have been substituted with lithium ions based on 1 molar equivalent of total carboxyl groups that may be substituted with lithium ions in the polymer. 0.44 g of 3,4-dihydroxyphenylamine hydrochloride at a ratio of 0.2 molar based on 1 molar equivalent of carboxyl groups in the lithium ion substituted PMVEMAn was added to the lithium ion substituted PMVEMAn solution (Li-0.8-PMVEMAn) therein so as to prepare a mixture, and the mixture was stirred, thereby preparing a binder solution containing the PMVEMAn (Li-0.8-PMVEMAn-0.2-DOPA) which is represented by Formula 8b below and includes a first repeating unit including a carboxyl group substituted with a lithium ion and a second repeating unit including a 3,4-dihydroxyphenylamine ammonium carboxylate salt.

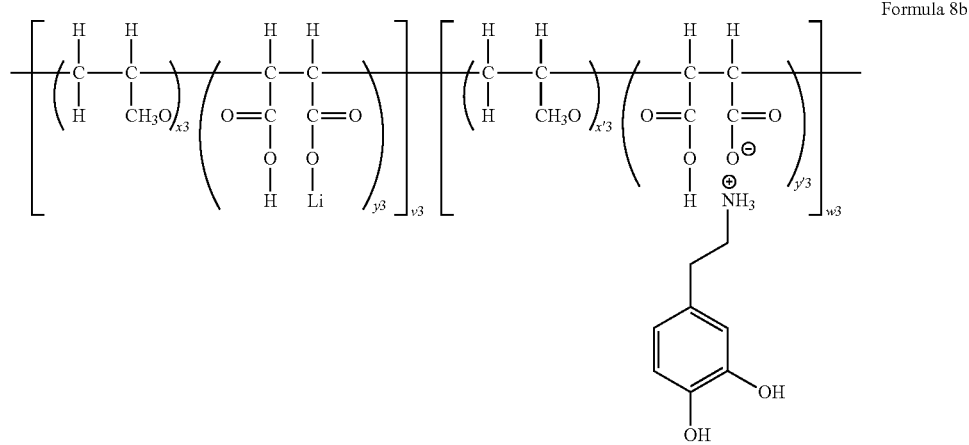

Formula 8b

Here, the content of the 3,4-dihydroxyphenylamine ammonium carboxylate salt in the PMVEMAn containing binder solution (Li-0.8-PMVEMAn-0.2-DOPA) was 32.0 mol %.

Comparative Preparation Example 1

Preparation of Polymer Containing Binder 0.170 g of LiOH anhydride was dissolved in 199 g of deionized water to prepare a LiOH solution, and 1 g of a polymer, i.e., polyacrylic acid (PAA) (Mv: 1,250,000, available from Aldrich company), was added to the LiOH solution so as to prepare a binder solution containing the lithium ion substituted PAA wherein a DS with a lithium ion in the PAA was 0.5. That is, the DS in the lithium ion substituted PAA solution (Li-0.5-PAA) refers to 0.5 molar equivalents of carboxyl groups that have been substituted with lithium ions based on 1 molar equivalent of total carboxyl groups that may be substituted with lithium ions in the polymer.

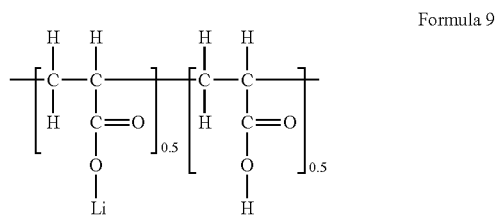

Formula 9

Comparative Preparation Example 2

Preparation of Polymer Containing Binder 1 g of a polymer, i.e., poly(methyl vinyl ether-alt-maleic acid) (PMVEMAn) (Mn: 960,000, available from Aldrich company), was dissolved in 99 g of deionized water, thereby preparing a binder solution containing poly(methyl vinyl ether-alt-maleic acid) (PMVEMAn)

Preparation of Negative Electrode and/or Lithium Battery

Example 1

Preparation of Negative Electrode and Lithium Battery 97.5 parts by weight of graphite (3HE, available from Shanshan Tech company (D50=20 μm) as a negative electrode active material, 1.5 parts by weight of SBR latex (BM451B, available from Zeon company), and 1.0 parts by weight of the PAA containing binder solution (Li-0.5-PAA-0.5-DOPA) of Preparation Example 1 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.5-PAA-0.5-DOPA) of Preparation Example 1, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 2

Preparation of Negative Electrode and Lithium Battery 97.5 parts by weight of graphite (3HE, available from Shanshan Tech company) (D50=20 μm) as a negative electrode active material, 1.5 parts by weight of SBR latex (BM451 B, available from Zeon company), and 1.0 parts by weight of the PAA containing binder solution (Li-0.6-PAA-0.4-DOPA) of Preparation Example 2 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.6-PAA-0.4-DOPA) of Preparation Example 2, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 3

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451 B, available from Zeon company), and 2.0 parts by weight of the PAA containing binder solution (Li-0.5-PAA-0.5-DOPA) of Preparation Example 1 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.5-PAA-0.5-DOPA) of Preparation Example 1, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 4

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451 B, available from Zeon company), and 2.0 parts by weight of the PAA containing binder solution (Li-0.6-PAA-0.4-DOPA) of Preparation Example 2 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.6-PAA-0.4-DOPA) of Preparation Example 2, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 5

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451B, available from Zeon company), and 2.0 parts by weight of the PAA containing binder solution (Li-0.7-PAA-0.3-DOPA) of Preparation Example 3 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.7-PAA-0.3-

DOPA) of Preparation Example 3, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 6

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451B, available from Zeon company), and 2.0 parts by weight of the PAA containing binder solution (Li-0.8-PAA-0.2-DOPA) of Preparation Example 4 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.8-PAA-0.2-DOPA) of Preparation Example 4, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 7

Preparation of negative electrode and lithium battery 97.0 parts by weight of graphite (3HE, available from Shanshan Tech company) (D50=20 μm) as a negative electrode active material, 1.5 parts by weight of SBR latex (BM451B, available from Zeon company), and 1.5 parts by weight of the PAA containing binder solution (Li-0.5-PAA-0.5-DOPA) of Preparation Example 1 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.5-PAA-0.5-DOPA) of Preparation Example 1, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 8

Preparation of Negative Electrode and Lithium Battery 97.0 parts by weight of graphite (3HE, available from Shanshan Tech company) (D50=20 μm) as a negative electrode active material, 1.5 parts by weight of SBR latex (BM451B, available from Zeon company), and 1.5 parts by weight of the PAA containing binder solution (Li-0.6-PAA-0.4-DOPA) of Preparation Example 2 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PAA containing binder solution (Li-0.6-PAA-0.4-DOPA) of Preparation Example 2, underwent dehydration upon the drying in the second repeating unit thereof. Accordingly, most of the 3,4-dihydroxyphenylamine ammonium carboxylate salt groups were converted to amide groups.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Example 9

Preparation of Negative Electrode 97.0 parts by weight of graphite (3HE, available from Shanshan Tech company) (D50=20 μm) as a negative electrode active material, 1.0 parts by weight of SBR latex (BM451B, available from Zeon company), and 2.0 parts by weight of the PMVEMAn containing binder solution (Li-0.5-PMVEMAn-0.5-DOPA) of Preparation Example 5 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PMVEMAn containing binder solution (Li-0.5-PMVEMAn-0.5-DOPA) of Preparation Example 5, underwent dehydration upon the drying in the second repeating unit thereof. Accordingly, most of the 3,4-dihydroxyphenylamine ammonium carboxylate salt groups were converted to amide groups.

Example 10

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451B, available from Zeon company), and 2.0 parts by weight of the PMVEMAn containing binder solution (Li-0.8-PMVEMAn-0.2-DOPA) of Preparation Example 6 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm. Here, the binder included in the prepared negative electrode, i.e., the PMVEMAn containing binder solution (Li-0.8-PMVEMAn-0.2-DOPA) of Preparation Example 6, underwent dehydration upon the drying in the second repeating unit thereof. Accordingly, most of the 3,4-dihydroxyphenylamine ammonium carboxylate salt groups were converted to amide groups.

Comparative Example 1

Preparation of Negative Electrode and Lithium Battery 97.5 parts by weight of graphite (3HE, available from Shanshan Tech company) (D50=20 μm) as a negative electrode active material, 1.5 parts by weight of SBR latex (BM451B, available from Zeon company), and 1.0 parts by weight of carboxymethylcellulose sodium salt (Na-CMC) (available from Daicel company) were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Comparative Example 2

Preparation of Negative Electrode and Lithium Battery 97.0 parts by weight of graphite (3HE, available from Shanshan Tech company) (D50=20 μm) as a negative electrode active material, 1.0 parts by weight of SBR latex (BM451B, available from Zeon company), and 2.0 parts by weight of Na-CMC (available from Daicel company) were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Comparative Example 3

Preparation of Negative Electrode and Lithium Battery 97.0 parts by weight of graphite (3HE, available from Shanshan Tech company) (D50=20 μm) as a negative electrode active material, 1.5 parts by weight of SBR latex (BM451B, available from Zeon company), and 1.5 parts by weight of Na-CMC (available from Daicel company) were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Comparative Example 4

Preparation of Negative Electrode and Lithium Battery 97.0 parts by weight of graphite (3HE, available from Shanshan Tech company) (D50=20 μm) as a negative electrode active material, 1.5 parts by weight of SBR latex (BM451B, available from Zeon company), and 1.5 parts by weight of the lithium ion substituted PAA binder solution (Li-0.5-PAA) of Comparative Preparation Example 1 were mixed together to prepare a slurry for forming a negative electrode. The slurry for forming the negative electrode was coated to a thickness of about 100 μm on a copper current collector by using a doctor blade, dried in an oven at a temperature of 80° C. for 2 hours, dried again in a vacuum at a temperature of 120° C. for 2 hours, and then, roll-pressed, thereby preparing a negative electrode having a negative electrode active material layer to a thickness in a range of 60 μm to 65 μm.

A CR-2032 coin half-cell was prepared by using the prepared negative electrode, lithium metal as a counter electrode, polypropylene (Cellgard 3510) as a separator, and a solution as an electrolyte in which 1.3 M $LiPF_6$ was dissolved in a mixture of EC and DEC.

Analysis Example 1

¹H-NMR Spectrum Analysis

Figure 2A:
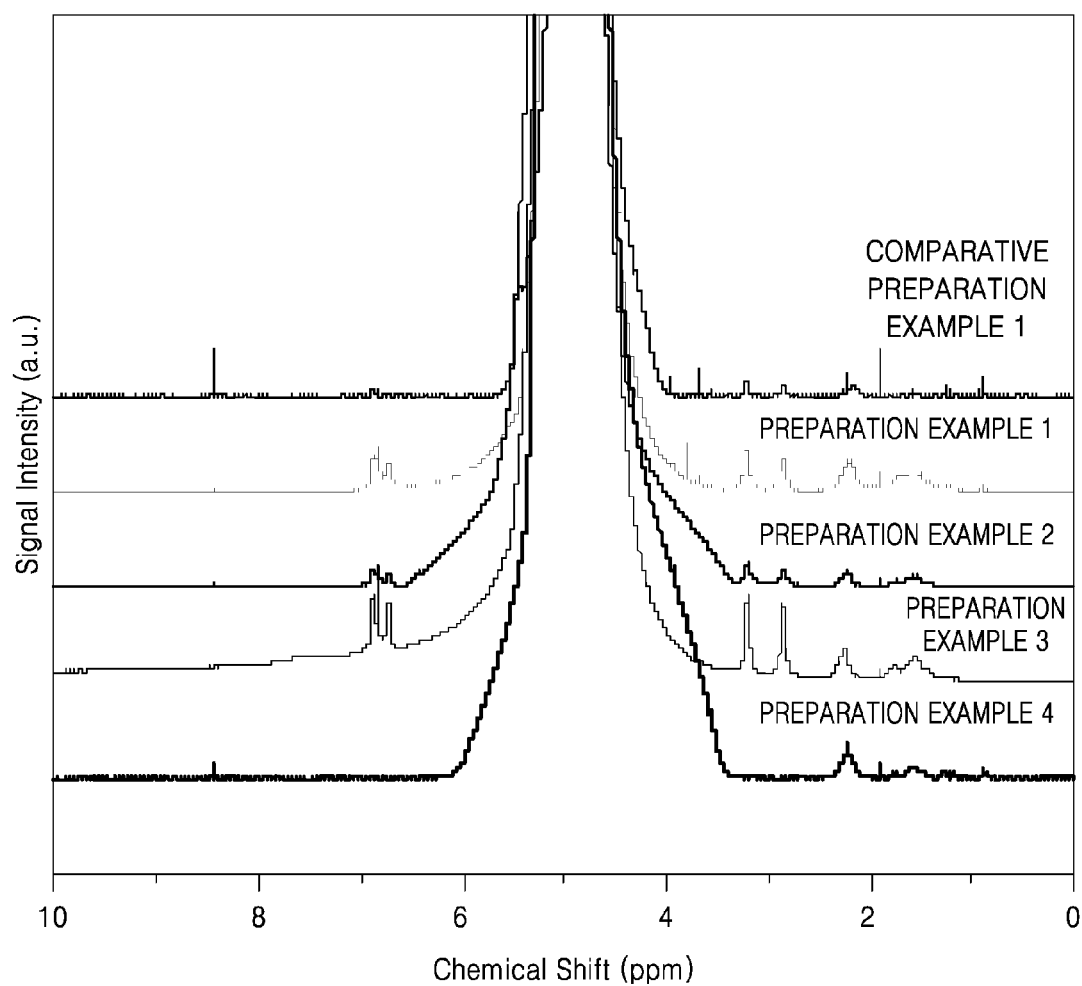
FIG. 2A is a graph of intensity (arbitrary units, a. u.) versus chemical shift (parts per million, ppm) showing analysis results of the $^1$H-Nuclear Magnetic Resonance (NMR) spectra of the polymers prepared according to Preparation Examples 1 to 4 and Comparative Preparation Example 1.
Figure 2B:
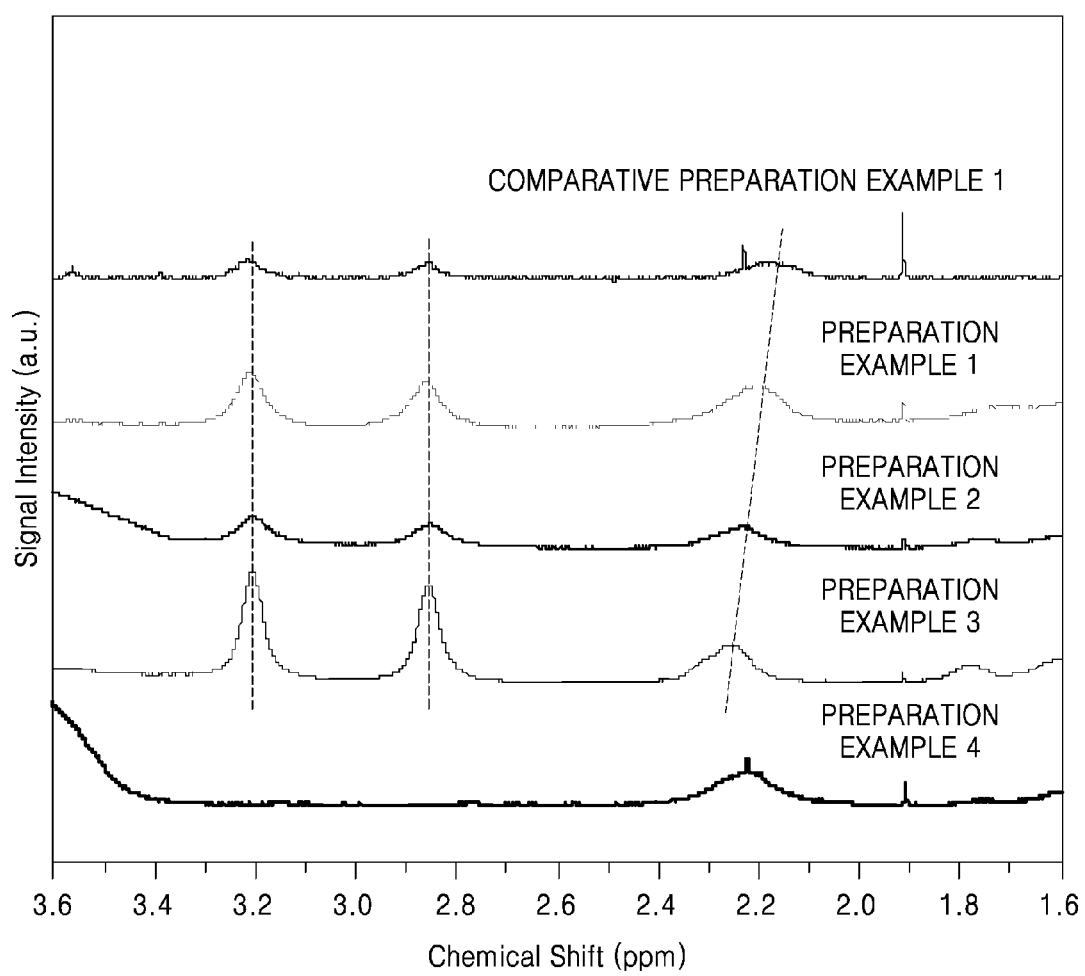
FIG. 2B is a graph of intensity (arbitrary units, a. u.) versus chemical shift (parts per million, ppm) showing magnified analysis results of $^1$H-NMR spectra of FIG. 2A in a chemical shift range from 1.6 ppm to 3.6 ppm.
Figure 2C:
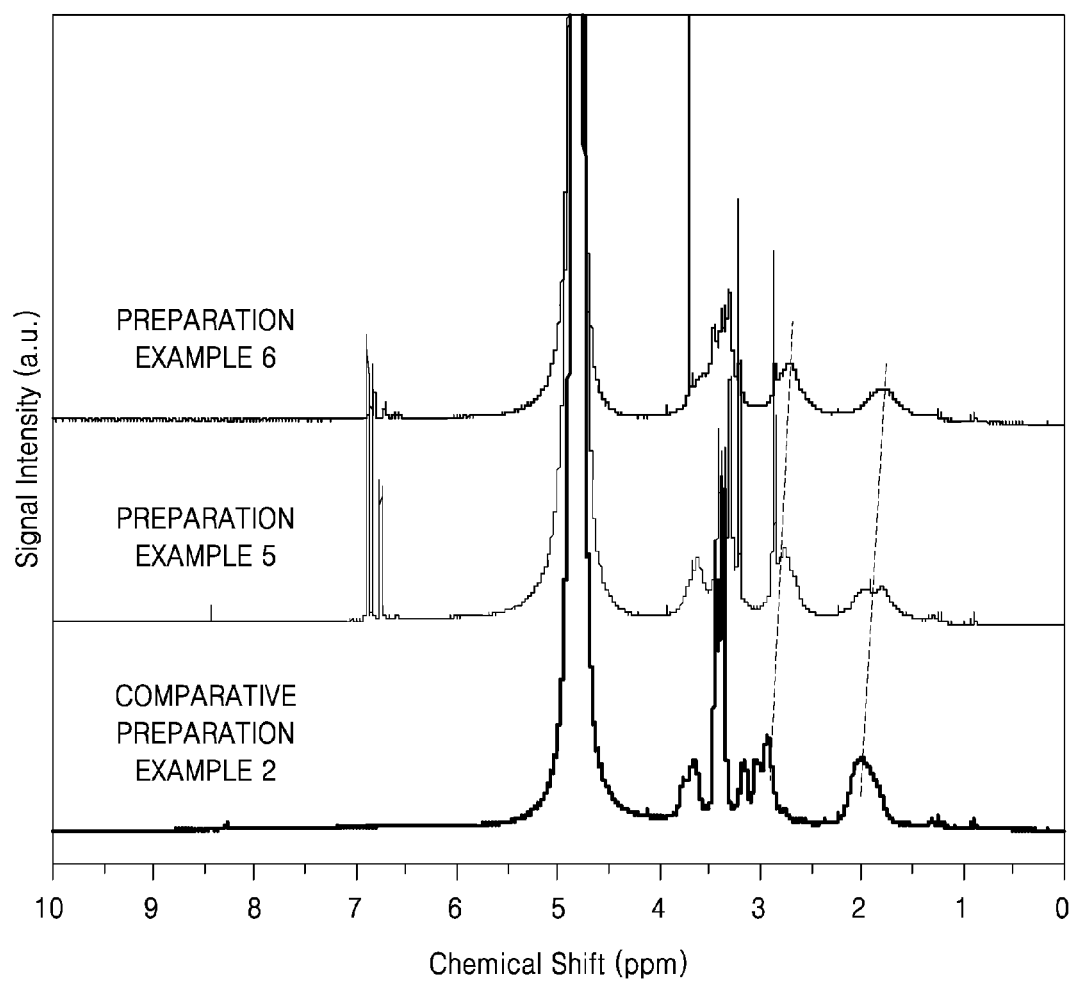
FIG. 2C is a graph of intensity (arbitrary units, a. u.) versus chemical shift (parts per million, ppm) showing analysis results of $^1$H-NMR spectra of the polymers prepared according to Preparation Examples 5 and 6 and Comparative Preparation Example 2.

¹H-NMR spectrum analysis was performed on sample solutions, each of which was prepared by dissolving each of the polymer containing binders of Preparation Examples 1 to 6 and Comparative Preparation Examples 1 and 2 in $D_2O$. The results are shown in FIGS. 2A to 2C. Here, DPX300 (300 MHz, available from Bruker company) was used as an NMR spectrometer.

Referring to FIGS. 2A and 2B, new peaks appeared at 2.86 parts per million (ppm) and 3.21 ppm by chemical shift of the polymer containing binders of Preparation Examples 1 to 4 and Comparative Preparation Example 1 upon substitution with the dihydroxyphenyl group-containing moiety. It was found that the size of the peaks was more likely to increase with the increase in content, i.e., the mole fraction, of the dihydroxyphenyl group-containing moiety. In addition, it was found that the chemical shift of the peaks was directed from 2.26 ppm to 2.18 ppm with the increase in content, i.e., the mole fraction, of the substituted Li ions for the carboxyl groups.

Referring to FIG. 2C, new peaks appeared at 6.60 ppm and 6.90 ppm by chemical shift of the polymer containing binders of Preparation Examples 5 and 6 and Comparative Preparation Example 2 upon substitution with the dihydroxyphenyl group-containing moiety. It was found that the size of the peaks was more likely to increase with the increase in content, i.e., the greater the mole fraction, of the dihydroxyphenyl group-containing moiety. In addition, it was found that the chemical shift of the peaks was directed from 2.00 ppm to 1.78 ppm with the increase in content, i.e., the mole fraction, of the substituted Li ions for the carboxyl groups.

Evaluation Example 1

Adhesion Evaluation

The negative electrodes Examples 1 to 10 and Comparative Examples 1 to 3 were evaluated in terms of adhesion between negative electrode materials and adhesion of negative electrode materials to the current collector. The results are shown in Tables 1 to 3 below.

The adhesion evaluation was performed in the following manner.

Negative electrode plates including the negative electrode materials according to Examples 1 to 10 and Comparative Examples 1 to 3 were cut into sizes of 25 millimeters (mm)×100 mm. A double-sided tape (available from 3M company) was adhered to a glass slide cut into a size of 25 mm×76 mm. One side of the double-sided tape was stripped away down to a 25 mm long from the top of the glass slide such that the double-sided tape was able to be adhered to the negative electrode materials on top of the negative electrode plates. A 180-degree peel test (ASTM D1876) was run 5 times on the adhered part at 100 millimeters per minute (mm/min) by using a tensile strength tester (Instron 3342, load capacity 50 kilogram-force, kgf). Accordingly, average values of the force (gram-force per millimeter, gf/mm) needed to remove the negative electrode materials of Examples 1 to 10 and Comparative Examples 1 to 3 from the current collector were obtained.

Tables 1 to 3 below each include data according to the polymer containing binder with the same content in the negative electrodes of Examples 1 to 10 and Comparative Examples 1 to 3, based on 100 parts by weight of the negative electrode active materials.

TABLE 1

| Division | Adhesion (gf/mm) |
| --- | --- |
| Example 1 | 0.36 |
| Example 2 | 0.45 |
| Comparative Example 1 | 0.33 |

TABLE 2

| Division | Adhesion (gf/mm) |
| --- | --- |
| Example 3 | 0.56 |
| Example 4 | 0.39 |
| Example 5 | 0.18 |
| Example 6 | 0.19 |
| Example 9 | 0.28 |
| Example 10 | 0.22 |
| Comparative Example 2 | 0.15 |

TABLE 3

| Division | Adhesion (gf/mm) |
| --- | --- |
| Example 7 | 0.95 |
| Example 8 | 1.30 |
| Comparative Example 3 | 0.50 |

As shown in Tables 1 to 3, it was determined that the negative electrodes of Examples 1 and 2 had better adhesion between negative electrode materials and better adhesion of negative electrode materials to the current collector, in comparison with the negative electrode of Comparative Example 1. It was also determined that the negative electrodes of Examples 3 to 6, 9, and 10, in comparison with the negative electrode of Comparative Example 2, and the negative electrodes of Examples 7 and 8, in comparison with the negative electrode of Comparative Example 3, had better adhesion between negative electrode materials and better adhesion of negative electrode materials to the current collector.

Evaluation Example 2

Evaluation of Charge and Discharge Characteristics

Figure 3A:
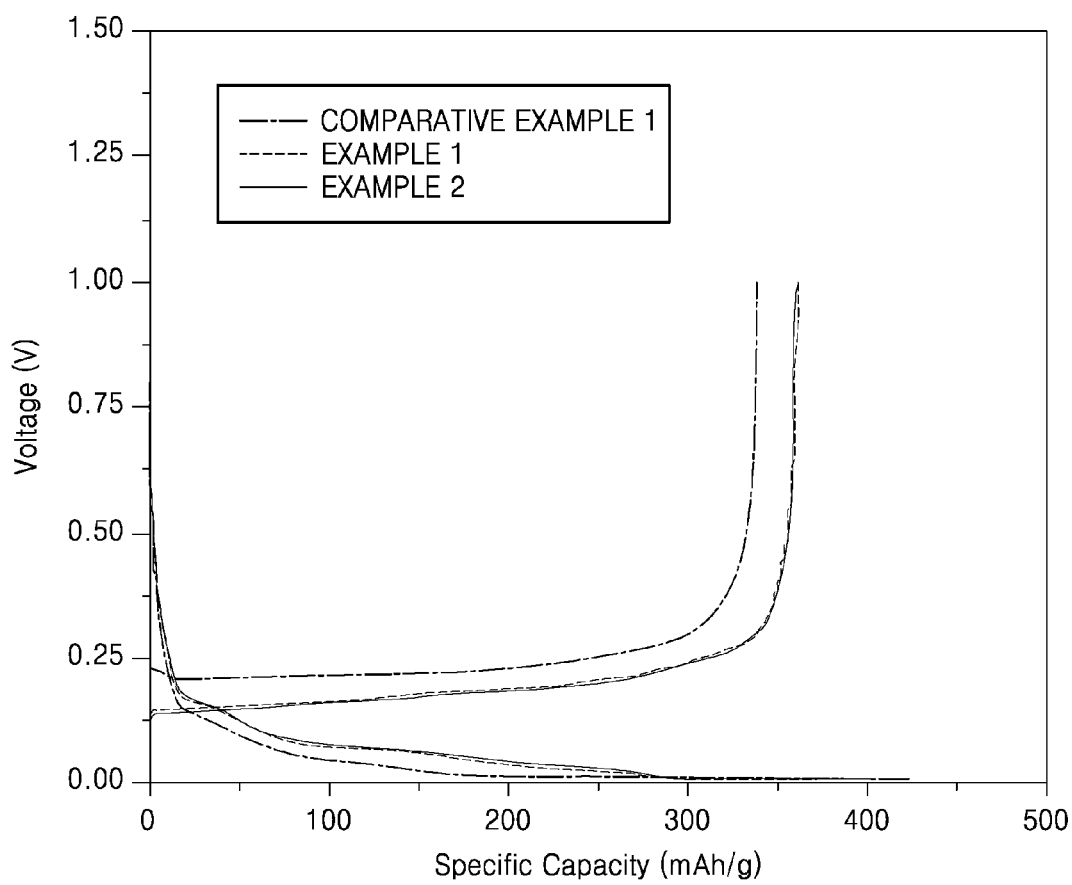
FIG. 3A is a graph of voltage (volts, V) versus specific capacity (milliampere-hours per gram, mAh/g) of lithium batteries prepared according to Examples 1 and 2 and Comparative Example 1.
Figure 3B:
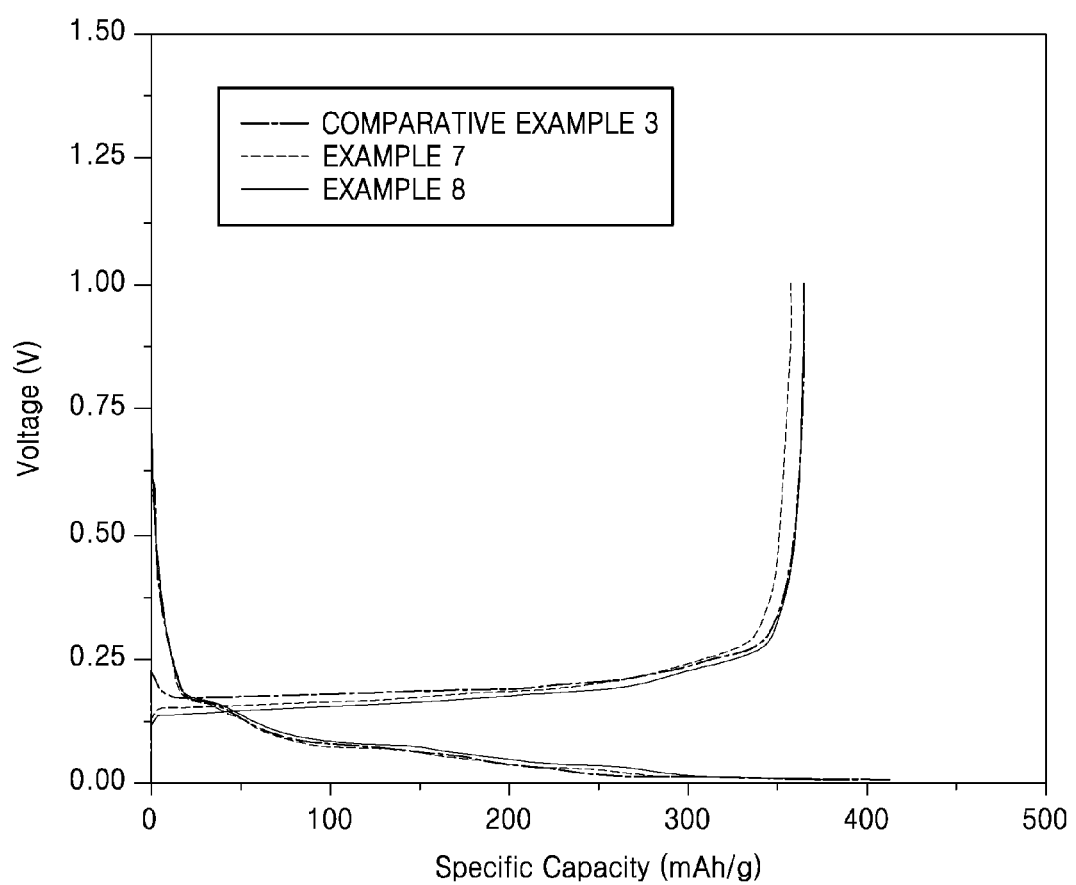
FIG. 3B is a graph of voltage (volts, V) versus specific capacity (milliampere-hours per gram, mAh/g) of lithium batteries prepared according to Examples 7 and 8 and Comparative Example 3.

The lithium batteries of Examples 1, 2, 7, and 8, and Comparative Examples 1 and 3 were evaluated in terms of charge and discharge characteristics, and the results are shown in FIGS. 3A and 3B.

The evaluation of charge and discharge characteristics with respect to lithium battery was performed as follows.

The lithium batteries of Examples 1, 2, 7, and 8, and Comparative Examples 1 and 3 were evaluated by using a charge/discharge test system (available by TOYO, TOYO-3100). Each of the lithium batteries was charged at a constant current of 0.5 coulombs (C) until the voltage thereof reached 0.01 volts (V), and then, charged at the same constant voltage until the current thereof reached 0 5 C, followed by a 10 minute rest. Next, each of the lithium batteries was discharged at the same constant current until the voltage thereof reached 1.0 V. Here, the term "C" used herein refers to a discharging speed of the battery obtained by dividing the total capacity of the battery by the total discharging time.

Referring to FIG. 3a, it was determined that the lithium batteries of Examples 1 and 2 had smaller polarization resistance than that of the lithium battery of Comparative Example 1, and accordingly, the lithium batteries of Examples 1 and 2 had excellent charge and discharge characteristics. Likewise, referring to FIG. 3B, it was determined that the lithium batteries of Examples 7 and 8 had smaller polarization resistance than that of the lithium battery of Comparative Example 3, and accordingly, the lithium batteries of Examples 7 and 8 had excellent charge and discharge characteristics.

Evaluation Example 3

Evaluation of Capacity Characteristics

The lithium batteries of Examples 1 and 6 and Comparative Examples 1 and 2 were evaluated in terms of capacity characteristics. The results are shown in FIG. 4.

The evaluation of capacity characteristics of the lithium batteries above was performed in the following manner.

A charge/discharge operation was performed at room temperature twice with respect to the lithium batteries of Examples 1 and 6 and Comparative Examples 1 and 2. In a first formation step, the lithium batteries were charged at a constant current of 0.1 C until the voltage thereof reached 0.01 V, charged at the same constant voltage until the current thereof reached 0.05 C, and discharged at a constant current of 0.1 C until the voltage thereof reached 1.0 V. A second formation step was performed in the same manner as in the first formation step. The lithium batteries that underwent the charge/discharge formation were charged at a constant current of 0.2 C under the same charge conditions described above, and then, discharged at a constant current of 0.2 C until the voltages thereof reached 1.0 V. The charge/discharge conditions provided herein were considered as standard charge/discharge conditions, and the discharge capacity of the battery provided herein was considered as a standard capacity of a battery. Accordingly, the lithium batteries were charged at a constant current of 0.5 C under the same charge conditions described above, and then, discharged at a constant current of 0.5 C until the voltages thereof reached 1.0 V.

Figure 4:
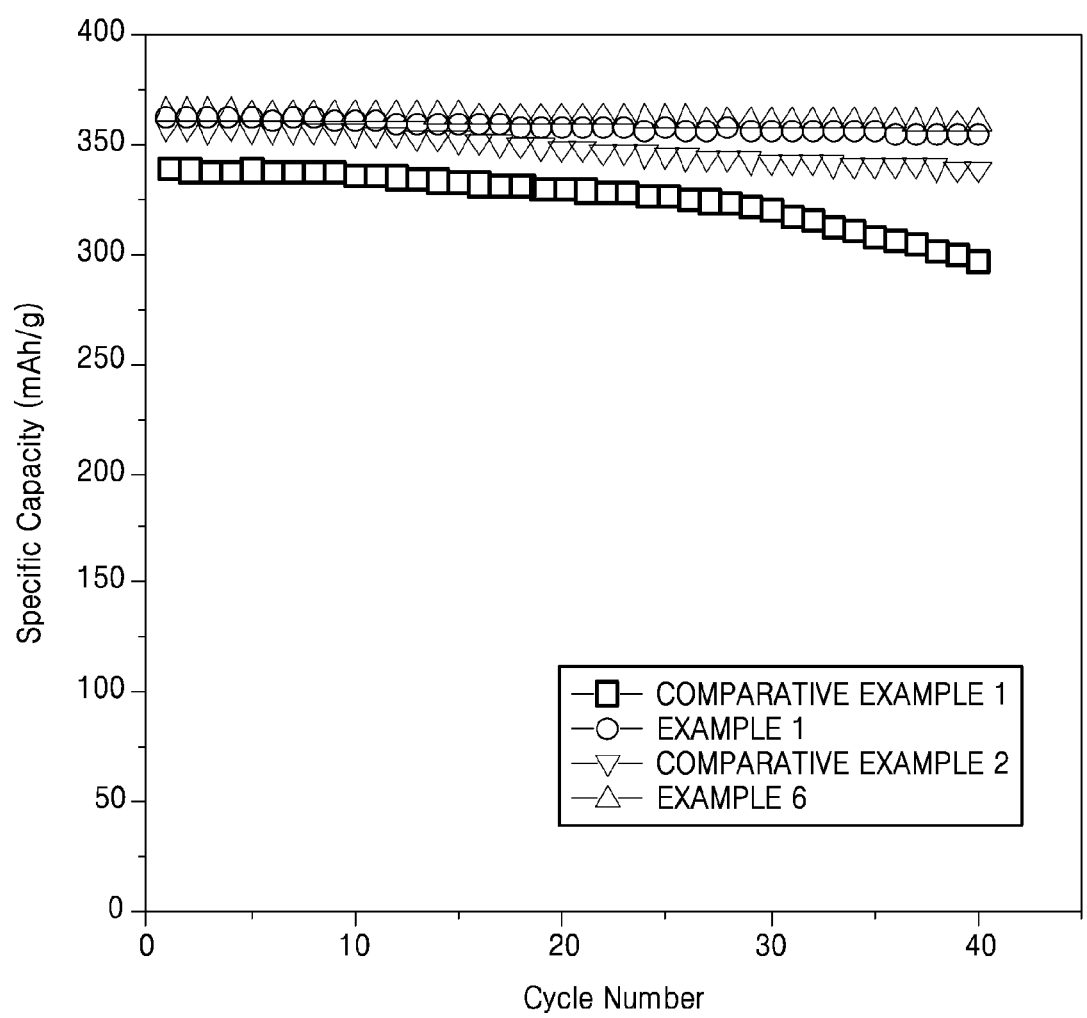
FIG. 4 is a graph of specific capacity (milliampere-hours per gram, mAh/g) versus cycle number showing capacity characteristics of lithium batteries prepared according to Examples 1 and 6 and Comparative Examples 1 and 2.

Referring to FIG. 4, the charge and discharge of the lithium batteries of Examples 1 and 6 was stable up to 40 cycles with specific capacities of about 360 milliampere-hours per gram (mAh/g), but the lithium batteries of Comparative Examples 1 and 2 tended to have decreased capacities after 30 cycles of the charge and discharge. In this regard, it was determined that the lithium batteries of Examples 1 and 6 had better capacities than those of Comparative Examples 1 and 2.

As described above, according to the one or more of the above embodiments, a polymer and a binder including the polymer may enhance adhesion between negative electrode materials included in a negative electrode active material layer and adhesion of negative electrode materials to a current collector. Accordingly, a negative electrode including the polymer and a lithium battery including the negative electrode may improve capacity and lifetime characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A polymer comprising:
a first repeating unit comprising at least one carboxyl group substituted with a cation, wherein the cation comprises at least one selected from $Li^+$, $Na^+$, $K^+$, and $NH_4^+$; and
a second repeating unit comprising at least one carboxyl group substituted with a moiety comprising a dihydroxyphenyl group,
wherein the first repeating unit is represented by Formula 1 and the second repeating unit is represented by Formula 2:

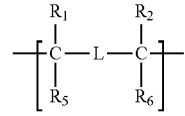

Formula 1 wherein in Formula 1,
L is selected from a single bond, a substituted or unsubstituted $C_1$-$C_6$ alkylene group, a substituted or unsubstituted $C_1$-$C_6$ heteroalkylene group, a substituted or unsubstituted $C_2$-$C_6$ alkenylene group, a substituted or unsubstituted $C_2$-$C_6$ alkynylene group, a substituted or unsubstituted $C_6$-$C_{10}$ arylene group, and a substituted or unsubstituted $C_6$-$C_{10}$ heteroarylene group;
$R_1$ and $R_2$ are each independently selected from a hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_7$-$C_{30}$ arylalkoxy group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_3$-$C_{30}$ heteroarylalkoxy group, a substituted or unsubstituted $C_4$-$C_{30}$ carbocyclic group, a substituted or unsubstituted $C_4$-$C_{30}$ carbocyclic oxy group, a substituted or unsubstituted $C_5$-$C_{30}$ carbocyclic alkyl group, a substituted or unsubstituted $C_5$-$C_{30}$ carbocyclic alkoxy group, a substituted or unsubstituted $C_2$-$C_{30}$ heterocyclic group, a substituted or unsubstituted $C_2$-$C_{30}$ heterocyclic oxy group, a substituted or unsubstituted $C_2$-$C_{30}$ heterocyclic alkyl group, and a substituted or unsubstituted $C_2$-$C_{30}$ heterocyclic alkoxy group; and $R_5$ and $R_6$ are each independently selected from a hydrogen, —C(=O)OH, and —C(=O)O-M, wherein M is selected from Li$^+$, Na$^+$, K$^+$, and NH$_4^+$, at least one of $R_5$ and $R_6$ is —C(=O)O-M; and

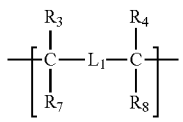

Formula 2 wherein in Formula 2,
$L_1$ is selected from a single bond, a substituted or unsubstituted $C_1$-$C_6$ alkylene group, a substituted or unsubstituted $C_1$-$C_6$ heteroalkylene group, a substituted or unsubstituted $C_2$-$C_6$ alkenylene group, a substituted or unsubstituted $C_2$-$C_6$ alkynylene group, a substituted or unsubstituted $C_6$-$C_{10}$ arylene group, and a substituted or unsubstituted $C_6$-$C_{10}$ heteroarylene group;
$R_3$ and $R_4$ are each independently selected from a hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_7$-$C_{30}$ arylalkyl group, a substituted or unsubstituted $C_7$-$C_{30}$ arylalkoxy group, a substituted or unsubstituted $C_2$-$C_{30}$ heteroaryl group, a substituted or unsubstituted $C_2$-$C_{30}$ heteroaryloxy group, a substituted or unsubstituted $C_3$-$C_{30}$ heteroarylalkyl group, a substituted or unsubstituted $C_3$-$C_{30}$ heteroarylalkoxy group, a substituted or unsubstituted $C_4$-$C_{30}$ carbocyclic group, a substituted or unsubstituted $C_4$-$C_{30}$ carbocyclic oxy group, a substituted or unsubstituted $C_5$-$C_{30}$ carbocyclic alkyl group, a substituted or unsubstituted $C_5$-$C_{30}$ carbocyclic alkoxy group, a substituted or unsubstituted $C_2$-$C_{30}$ heterocyclic group, a substituted or unsubstituted $C_2$-$C_{30}$ heterocyclic oxy group, a substituted or unsubstituted $C_2$-$C_{30}$ heterocyclic alkyl group, and a substituted or unsubstituted $C_2$-$C_{30}$ heterocyclic alkoxy group; and
$R_7$ and $R_8$ are each independently selected from a hydrogen, —C(=O)OH, an amide group substituted with $R_a$, and an ammonium carboxylate salt substituted with $R_a$, wherein $R_a$ is a 3,4-dihydroxyphenyl group linked to an unsubstituted $C_1$-$C_5$ alkylene group, provided that at least one of $R_7$ and $R_8$ is at least one selected from an amide group substituted with $R_a$ and an ammonium carboxylate salt substituted with $R_a$.

2. The polymer of claim 1, wherein the moiety comprising a dihydroxyphenyl group comprises at least one selected from a moiety comprising a 3,4-dihydroxyphenyl group linked to a $C_1$-$C_5$ alkylene group substituted with a hydroxyl group, a moiety comprising a 3,4-dihydroxyphenyl group linked to an unsubstituted $C_1$-$C_5$ alkylene group, a 3,4-dihydroxyphenyl group linked to a $C_1$-$C_5$ heteroalkylene group substituted with a hydroxyl group, and a moiety comprising a 3,4-dihydroxyphenyl group linked to an unsubstituted $C_1$-$C_5$ heteroalkylene group.

3. The polymer of claim 1, wherein the moiety comprising a dihydroxyphenyl group comprises at least one selected from 2-(3,4-dihydroxyphenyl)ethyl-1-amine, 2-hydroxy-2-(3,4-dihydroxyphenyl)ethyl-1-amine, and 2-hydroxy-2-(3,4-dihydroxyphenyl)ethyl-1-methylamine.

4. The polymer of claim 1, wherein the polymer has a weight average molecular weight in a range of about 100,000 Daltons to about 3,000,000 Daltons.

5. The polymer of claim 1, wherein the polymer further comprises a third repeating unit represented by Formula 3 and a fourth repeating unit represented by Formula 4:

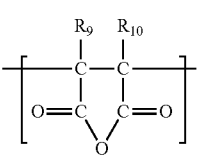

Formula 3 wherein in Formula 3,
$R_9$ and $R_{10}$ are each independently selected from a hydrogen and a substituted or unsubstituted $C_1$-$C_{10}$ alkyl group,

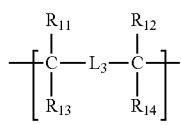

Formula 4 wherein in Formula 4,
$L_3$ is selected from a single bond, a substituted or unsubstituted $C_1$-$C_{10}$ alkylene group, a substituted or unsubstituted $C_1$-$C_{10}$ heteroalkylene group, a substituted or unsubstituted $C_2$-$C_{10}$ alkenylene group, a substituted or unsubstituted $C_2$-$C_{10}$ alkynylene group, a substituted or unsubstituted $C_6$-$C_{10}$ arylene group, a substituted or unsubstituted $C_6$-$C_{10}$ heteroarylene group; and
$R_{11}$ to $R_{14}$ are each independently selected from a hydrogen, —C(=O)OH, a substituted or unsubstituted $C_1$-$C_{10}$ alkyl group, and a substituted or unsubstituted $C_1$-$C_{10}$ alkoxy group.

6. The polymer of claim 5, wherein the polymer has a weight average molecular weight in a range of about 100,000 Daltons to about 3,000,000 Daltons.

7. The polymer of claim 1, wherein the polymer comprises at least one of polymers represented by Formulae 5 to 8, and has a weight average molecular weight in a range of about 100,000 Daltons to about 3,000,000 Daltons:

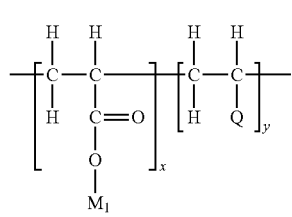

Formula 5 wherein in Formula 5,
x and y each indicate a mole fraction, and 0<x <1, 0<y <1, provided that x+y =1;

$M_1$ is at least one selected from $Li^+$, $Na^+$, $K^+$, and $NH_4^+$; and

Q is at least one selected from an amide group substituted with $R_b$ and an ammonium carboxylate salt substituted with $R_b$, wherein $R_b$ is a 3,4-dihydroxyphenyl group linked to an unsubstituted $C_1$-$C_5$ alkylene group, Formula 6

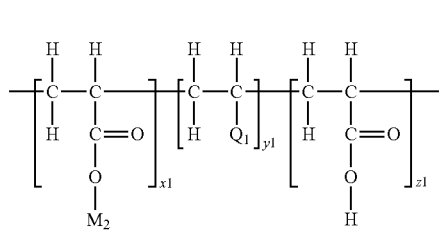

wherein in Formula 6, $x_1$, $y_1$, and $z_1$ each indicate a mole fraction, and $0 < x_1 < 1$, $0 < y_1 < 1$, $0 < z_1 < 1$, provided that $x_1 + y_1 + z_1 = 1$;

$M_2$ is at least one selected from $Li^+$, $Na^+$, $K^+$, and $NH_4^+$; and $Q_1$ is at least one selected from an amide group substituted with $R_c$, and an ammonium carboxylate salt substituted with $R_c$, wherein $R_c$, is a 3,4-dihydroxyphenyl group linked to an unsubstituted $C_1$-$C_5$ alkylene group, Formula 7

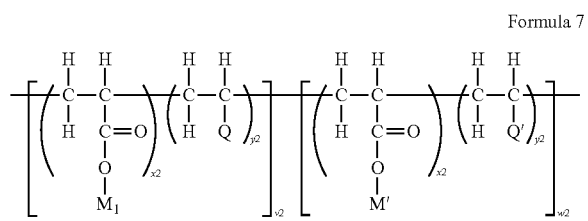

wherein in Formula 7, $x_2$ and $y_2$ each indicate a mole fraction, and $0 < x_2 < 1$, $0 < y_2 < 1$, provided that $x_2 + y_2 = 1$;

$v_2$ and $w_2$ each indicate a mole fraction, and $0 < v_2 < 1$, $0 < w_2 < 1$, provided that $v_2 + w_2 = 1$;

$M_1$ and $M'$ are each independently at least one selected from $Li^+$, $Na^+$, $K^+$, and $NH_4^+$; and Q is an amide group substituted with $R_d$ and Q' is an ammonium carboxylate salt substituted with $R_d$, wherein $R_d$ is a 3,4-dihydroxyphenyl group linked to an unsubstituted $C_1$-$C_5$ alkylene group, $v_3$ and $w_3$ each indicate a mole fraction, and $0 < v_3 < 1$, $0 < w_3 < 1$, provided that $v_3 + w_3 = 1$;

$L_4$ and $L_5$ are each independently selected from a single bond, a substituted or unsubstituted $C_1$-$C_6$ alkylene group, a substituted or unsubstituted $C_1$-$C_6$ heteroalkylene group, a substituted or unsubstituted $C_2$-$C_6$ alkenylene group, a substituted or unsubstituted $C_2$-$C_6$ alkynylene group, a substituted or unsubstituted $C_6$-$C_{10}$ arylene group, and a substituted or unsubstituted $C_6$-$C_{10}$ heteroarylene group;

$R_{15}$ to $R_{22}$ are each independently selected from a hydrogen, a substituted or unsubstituted $C_1$-$C_{10}$ alkyl group, and a substituted or unsubstituted $C_1$-$C_{10}$ alkoxy group;

$M_3$ is at least one selected from $Li^+$, $Na^+$, $K^+$, and $NH_4^+$; and $Q_2$ is at least one selected from an amide group substituted with $R_d$ and an ammonium carboxylate salt substituted with $R_d$, wherein $R_d$ is a 3,4-dihydroxyphenyl group linked to an unsubstituted $C_1$-$C_5$ alkylene group.

8. The polymer of claim 1, wherein the polymer has a weight average molecular weight in a range of about 100,000 Daltons to about 3,000,000 Daltons.

9. The polymer of claim 1, wherein the polymer has a degree of substitution with a cation in a range of about 0.2 to about 0.99 molar equivalents.

10. The polymer of claim 1, wherein the moiety comprising a dihydroxyphenyl group is linked to the at least one carboxyl group of the second repeating unit through an ionic bond, and wherein a mole fraction of the second repeating unit in the polymer is in a range of about 3 mole percent to about 70 mole percent.

11. The polymer of claim 1, wherein the moiety comprising a dihydroxyphenyl group is linked to the at least one carboxyl group of the second repeating unit through an amide bond, and wherein a mole fraction of the second repeating unit in the polymer is in a range of about 3 mole percent to about 70 mole percent.

12. A binder comprising the polymer of claim 1.

13. A lithium battery comprising a negative electrode comprising the binder of claim 12 and a negative electrode active material.

14. The lithium battery of claim 13, wherein a content of the binder is in a range of about 0.5 to about 20 parts by weight based on 100 parts by weight of the negative electrode active material.

15. The lithium battery of claim 13, wherein the negative electrode active material comprises at least one selected from a carbonaceous material, silicon, silicon oxide, a silicon alloy, tin, tin oxide, and a tin alloy.

Formula 8

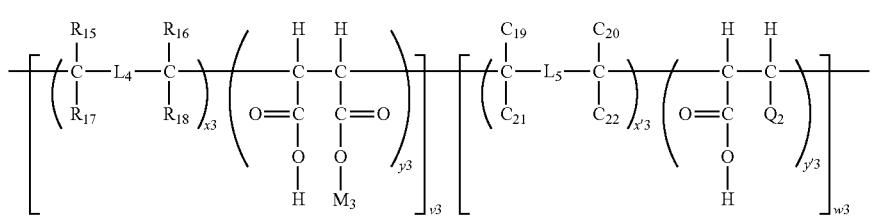

wherein in Formula 8, $x_3$ and $y_3$ each indicate a mole fraction, and $0 < x_3 < 1$, $0 < y_3 < 1$, provided that $x_3 + y_3 = 1$;

$x'_3$ and $y'_3$ each indicate a mole fraction, and $0 < x'_3 < 1$, $0 < y'_3 < 1$, provided that $x'_3 + y'_3 = 1$;

16. The lithium battery of claim 13, wherein the negative electrode further comprises a water-comprising binder.

17. The lithium battery of claim 16, wherein the water-comprising binder comprises at least one selected from styrene-butadiene rubber, carboxymethylcellulose, sodium-carboxymethylcellulose, polyacrylic acid, polyvinylalcohol, hydroxypropylene cellulose, and diacetylene cellulose.

18. The lithium battery of claim 16, wherein the content of the water-comprising binder is in a range of about 1 to about 15 parts by weight based on 100 parts by weight of the negative electrode active material.

* * * * *